United States Patent
Takeda et al.

(10) Patent No.: US 10,990,535 B2
(45) Date of Patent: Apr. 27, 2021

(54) STORAGE CONTROL APPARATUS AND STORAGE CONTROL METHOD FOR DEDUPLICATION

(71) Applicant: FUJITSU LIMITED, Kawasaki (JP)

(72) Inventors: Naohiro Takeda, Zushi (JP); Norihide Kubota, Kawasaki (JP); Yoshihito Konta, Kawasaki (JP); Toshio Kikuchi, Sagamihara (JP); Yusuke Kurasawa, Nagano (JP); Yuji Tanaka, Inagi (JP); Marino Kajiyama, Yokohama (JP); Yusuke Suzuki, Kawasaki (JP); Yoshinari Shinozaki, Kawasaki (JP); Takeshi Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 87 days.

(21) Appl. No.: 15/955,236

(22) Filed: Apr. 17, 2018

(65) Prior Publication Data
US 2018/0307616 A1 Oct. 25, 2018

(30) Foreign Application Priority Data
Apr. 20, 2017 (JP) .............................. JP2017-083352

(51) Int. Cl.
*G06F 12/10* (2016.01)
*G06F 11/10* (2006.01)
*G06F 3/06* (2006.01)

(52) U.S. Cl.
CPC ............ *G06F 12/10* (2013.01); *G06F 3/0608* (2013.01); *G06F 3/0641* (2013.01);
(Continued)

(58) Field of Classification Search
CPC .... G06F 3/0608; G06F 3/0641; G06F 3/0683; G06F 11/1004; G06F 11/1076; G06F 11/108; G06F 12/10
See application file for complete search history.

(56) References Cited

U.S. PATENT DOCUMENTS 9,250,823 B1 * 2/2016 Kamat ................. G06F 3/0647
10,031,675 B1 * 7/2018 Veprinsky ............... G06F 3/065
(Continued)

FOREIGN PATENT DOCUMENTS

JP 2004-288078 10/2004
JP 2009-80696 4/2009
(Continued)

OTHER PUBLICATIONS

Japanese Office Action dated Sep. 4, 2018 for corresponding Japanese Patent Application No. 2017-083352, with English Translation, 27 pages.

*Primary Examiner* — Larry T Mackall
(74) *Attorney, Agent, or Firm* — Fujitsu Patent Center

(57) ABSTRACT

A storage control apparatus includes a memory to store meta-information associating a position of a logical area with a position of a physical area, and a processor to, when a first data block including data, a check code corresponding to the data, and first information related to a position within the logical area is stored in the physical area, and a second data block including the data, the check code, and second information related to a position within the logical area is written in the logical area, obtain a first position at which the first data block is present in the physical area, based on meta-information of the first data block in the meta-information, associate the first position as a position of the physical area in meta-information of the second data block in the meta-information with the position to which the second data block is written in the logical area.

6 Claims, 22 Drawing Sheets

(52) U.S. Cl.
CPC ........ *G06F 3/0683* (2013.01); *G06F 11/1004* (2013.01); *G06F 11/108* (2013.01); *G06F 11/1076* (2013.01)

(56) References Cited

U.S. PATENT DOCUMENTS

| | | | |
|---|---|---|---|
| 2002/0129192 A1* | 9/2002 | Spiegel | G06F 12/0246 |
| | | | 711/103 |
| 2005/0071553 A1 | 3/2005 | Mannen et al. | |
| 2009/0083610 A1 | 3/2009 | Arai et al. | |
| 2009/0292861 A1* | 11/2009 | Kanevsky | G06F 3/061 |
| | | | 711/103 |
| 2011/0307447 A1* | 12/2011 | Sabaa | G06F 16/24556 |
| | | | 707/637 |
| 2013/0114339 A1 | 5/2013 | Kawamura et al. | |
| 2016/0365874 A1 | 12/2016 | Nagashima | |

FOREIGN PATENT DOCUMENTS

| | | |
|---|---|---|
| JP | 2013-532853 | 8/2013 |
| JP | 2014-225297 | 12/2014 |
| JP | 2017-4399 | 1/2017 |
| WO | 2012/056491 | 5/2012 |

* cited by examiner

※ DATA IS REARRANGED SO AS TO BE DISTRIBUTED TO EACH Node AT TIME OF Node ADDITION

FIG. 7

| Offset | Byte0 | Byte1 | Byte2 | Byte3 |
|---|---|---|---|---|
| | | | | (8 byte) |
| 0x00 | Disk Pool No. | Reserved | RAID Unit Offset LBA | |
| 0x04 | RAID Unit No. | | | |

209

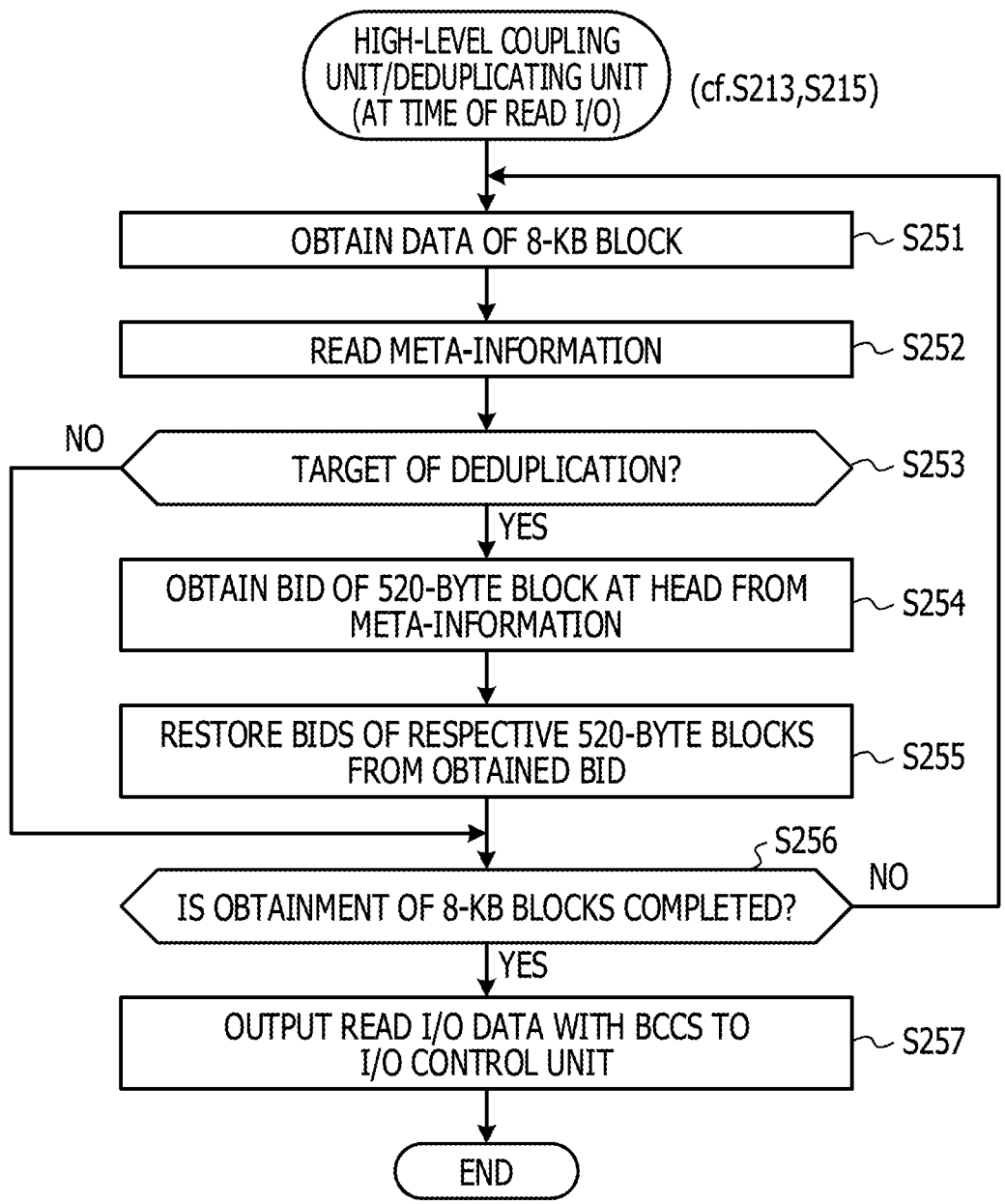

STORAGE CONTROL APPARATUS AND STORAGE CONTROL METHOD FOR DEDUPLICATION

CROSS-REFERENCE TO RELATED APPLICATION

This application is based upon and claims the benefit of priority of the prior Japanese Patent Application No. 2017-83352, filed on Apr. 20, 2017, the entire contents of which are incorporated herein by reference.

FIELD

The present disclosure is related to a storage control apparatus and a storage control method.

BACKGROUND

A large amount of data handled by a server device such as a business server or the like is, for example, managed by a storage system including a storage apparatus having a high storage capacity. The storage system processes input/output (I/O) of data using a logical storage area (logical area) and a storage area (physical area) of a storage device included in the storage apparatus.

As the storage device, there is a recording medium such as a hard disk drive (HDD), a solid state drive (SSD), or the like, a redundant arrays of inexpensive disks (RAID) device in which a plurality of recording media are used in combination, or the like. There is also a technology in which the physical areas of a plurality of storage devices are integrated with each other, and used as one virtual physical area (storage pool/disk pool). In a case of a storage apparatus including a cache, the cache may be temporarily used as a physical area.

The server device accesses a logical area for data. When data is written to a certain logical area, the storage apparatus writes the data to the address (physical address) of a physical area corresponding to the address (logical address) of the logical area to which the data is written. At this time, even when other data having the same contents as the newly written data is present in a physical area, in a case where the logical address as the writing destination and the logical address of the other data are different from each other, the data is written to the physical address different from that of the other data.

The capacity of a physical area provided by hardware resources such as an HDD, an SSD, or the like is limited. There is thus a method of making effective use of a physical area by associating a plurality of logical addresses with a same physical address when data having same contents is written to the plurality of logical addresses. This method is referred to as deduplication.

When deduplication is performed with data blocks as units, the data blocks being a target of I/O processing, for example, a plurality of identical data blocks are a target of deduplication. When there is data only slightly differing between data blocks, on the other hand, the data blocks are excluded from the target.

In the storage system, a check code used for error detection at a time of I/O processing or the like may be added to user data. In addition, a guarantee code having contents different for each piece of user data may be added to user data. In this case, the part of the guarantee code has contents different for each piece of user data. Thus, even when there is user data having same contents, there is a risk of the user data being excluded from targets of deduplication. In order to deal with this risk, a method is proposed which separates user data from a guarantee code, and stores the guarantee code in a storage area.

Incidentally, a method is proposed which collectively manages a plurality of guarantee codes by a sector length, and associates the guarantee codes with data. In addition, a disk array device is proposed which adds a guarantee code to each logical data block, and performs a check at a time of readout. This disk array device adopts a method of changing an attribute unique to one piece of data to an attribute unique to another piece of data so that a guarantee code coincides between the pieces of data as a target of deduplication.

A related technology is disclosed in Japanese Laid-open Patent Publication No. 2014-225297, 2004-288078, or 2009-80696.

SUMMARY

According to an aspect of the embodiments, a storage control apparatus includes a memory configured to, when a first data block including data, a check code corresponding to the data, and first information related to a position within the logical area is stored in the physical area, and a second data block including the data, the check code, and second information related to a position within the logical area is written in the logical area, obtain a first position at which the first data block is present in the physical area, based on meta-information of the first data block in the meta-information, associate the first position as a position of the physical area in meta-information of the second data block in the meta-information with the position to which the second data block is written in the logical area, and store the second information obtained from the second data block in the memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram of assistance in explaining a structure and contents of meta-address information;

FIG. 22 is a flowchart of assistance in explaining a flow of processing related to BID restoration and the like in processing at a time of READ I/O.

DESCRIPTION OF EMBODIMENTS

Information such as check codes or the like generated based on contents of data often have same contents when the contents of the data are the same. In addition, deduplication becomes possible when the contents of guarantee codes are made to coincide with each other by changing an attribute unique to data as in the above-described proposed system. However, processing occurs which changes a guarantee code so that the guarantee codes of data as a target of deduplication coincide with each other.

According to one aspect, it is an object of the present disclosure to provide a storage control apparatus and a storage control program that may easily achieve deduplication of data each piece of which has different information added thereto.

Embodiments of the present disclosure will be described in the following with reference to the accompanying drawings. Incidentally, repeated description of elements having substantially the same functions in the present specification and the drawings may be omitted by identifying the elements by the same reference symbols.

1. First Embodiment

A first embodiment will be described with reference to FIG. 1. The first embodiment relates to a storage control apparatus providing a deduplicating function.

Figure 1:
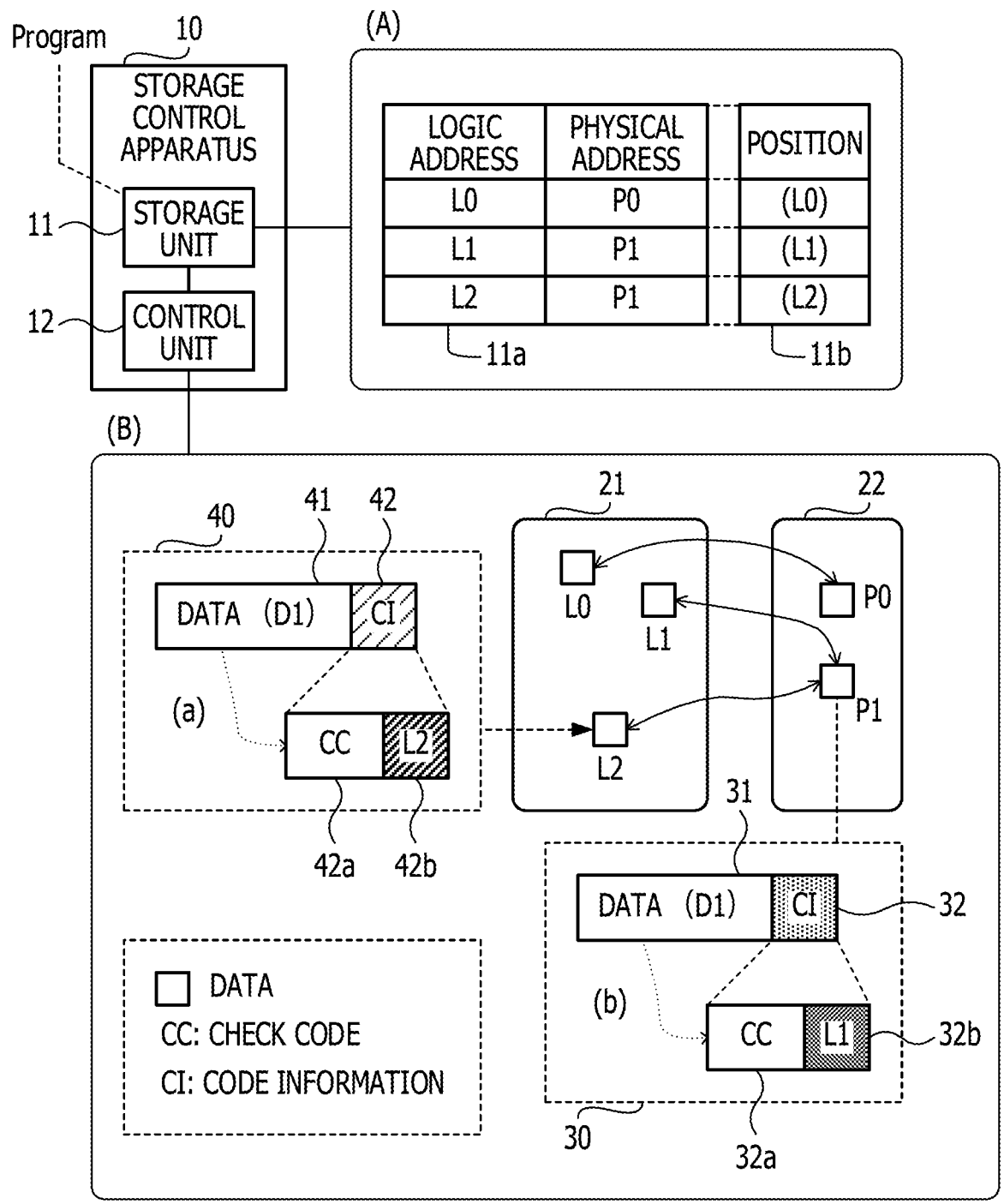
FIG. 1 is a diagram illustrating an example of a storage control apparatus according to a first embodiment.

FIG. 1 is a diagram illustrating an example of a storage control apparatus according to the first embodiment. Incidentally, a storage control apparatus 10 illustrated in FIG. 1 is an example of the storage control apparatus according to the first embodiment.

As illustrated in FIG. 1, the storage control apparatus 10 includes a storage unit 11 and a control unit 12.

The storage unit 11 is a volatile storage device such as a random access memory (RAM) or the like or a nonvolatile storage device such as an HDD, a flash memory, or the like. The control unit 12 is a processor such as a central processing unit (CPU), a digital signal processor (DSP), an application specific integrated circuit (ASIC), a field programmable gate array (FPGA), or the like. The control unit 12, for example, executes a program stored in the storage unit 11 or another memory.

The storage unit 11 stores meta-information 11a that associates positions of a logical area 21 with positions of a physical area 22.

The physical area 22 is a physical storage area of a recording medium such as an HDD, an SSD, or the like, a storage device such as a RAID device or the like in which a plurality of recording media are combined with each other, a storage pool in which physical storage areas of a plurality of storage devices are integrated with each other, or the like. The logical area 21 is a logical storage area associated with at least a part of the physical area 22.

A position of the logical area 21 may be expressed by a logical address, for example. A position of the physical area 22 may be expressed by a physical address, for example. As in (A) of FIG. 1, the meta-information 11a associates logical addresses L0, L1, and L2 with physical addresses P0 and P1. In addition, in the example of FIG. 1, information 11b related to positions is stored in the storage unit 11. The information 11b related to positions is information different for each position of data in the logical area 21.

In the example of FIG. 1, a first data block 30 is present in the physical area 22, the first data block 30 including data 31 (data D1), a check code 32a for the data D1, and first information 32b related to a position (logical address L1) within the logical area 21. The check code 32a is a code such as a cyclic redundancy check (CRC) or the like generated based on the data 31. The first information 32b is information changing depending on the position of the data 31 present in the logical area 21.

It is to be noted that in this stage, the physical address P1 is not associated with the logical address L2 in the meta-information 11a, and the information of L2 is not registered in a field corresponding to the data to be located at the logical address L2 in the information 11b related to positions.

When the control unit 12 writes, to the logical area 21, a second data block 40 including data 41 (data D1), a check code 42a, and second information 42b related to the position L2 within the logical area 21 in the above-described state, the control unit 12 performs deduplication for the data D1.

The data 41 has the same contents (data D1) as the data 31. The check code 42a is a code such as a CRC or the like generated based on the data 41. Because the data 31 and 41 is the same data D1, the check codes 32a and 42a are the same code. On the other hand, the second information 42b is information changing depending on the position of the data 41 present in the logical area 21. The first information 32b and the second information 42b are therefore different from each other.

In the above-described case, the first data block 30 and the second data block 40 are data blocks that are mostly the same (the data 31 and 41 and the check codes 32a and 42a) but are partly different from each other (the first information 32b and the second information 42b). In addition, the second information 42b indicating the position of the data 41 in the logical area 21 is used at a time of reading the data 41.

Using the meta-information 11a, the control unit 12 associates the position (logical address L2) in the logical area 21 to which position the second data block 40 is written with the position (physical address P1) in the physical area 22 at which position the first data block 30 is present (state of (A)). In this stage, the two logical addresses L1 and L2 are associated with the one physical address P1 at which the data D1 is present, and thus deduplication is applied to the data D1.

However, the first data block 30 including the first information 32b different from the second information 42b is stored at the physical address P1 associated with the logical address L2. Therefore, when the second data block 40 is read based on the meta-information 11a, the first data block 30 present at the physical address P1 is read from the physical area 22. Therefore, the control unit 12 obtains the second information 42b from the second data block 40, and stores the obtained second information 42b as information 11b related to the position in the storage unit 11.

When the control unit 12 reads the second data block 40, the control unit 12 reads the first data block 30 from the physical area 22, and restores the second data block 40 using the second information 42b obtained from the storage unit 11. For example, the control unit 12 restores the second data block 40 by deleting the first information 32b included in the first data block 30, and adding the second information 42b to the data 31 and the check code 32a.

As described above, when deduplication is performed between data blocks including information that changes depending on the position of data in the logical area 21, the information is stored in the storage unit 11. Thus, the original data blocks may be restored using the information present in the storage unit 11. This method completes deduplication by updating the meta-information 11a without rewriting the information differing between the data blocks at a time of writing the data blocks. Therefore, the processing of deduplication is simplified, and a contribution is made to reducing a time and a load involved in the processing of deduplication.

The first embodiment has been described above.

2. Second Embodiment

A second embodiment will next be described. The second embodiment relates to a storage system having a deduplicating function.

[2-1. System]

Figure 2:
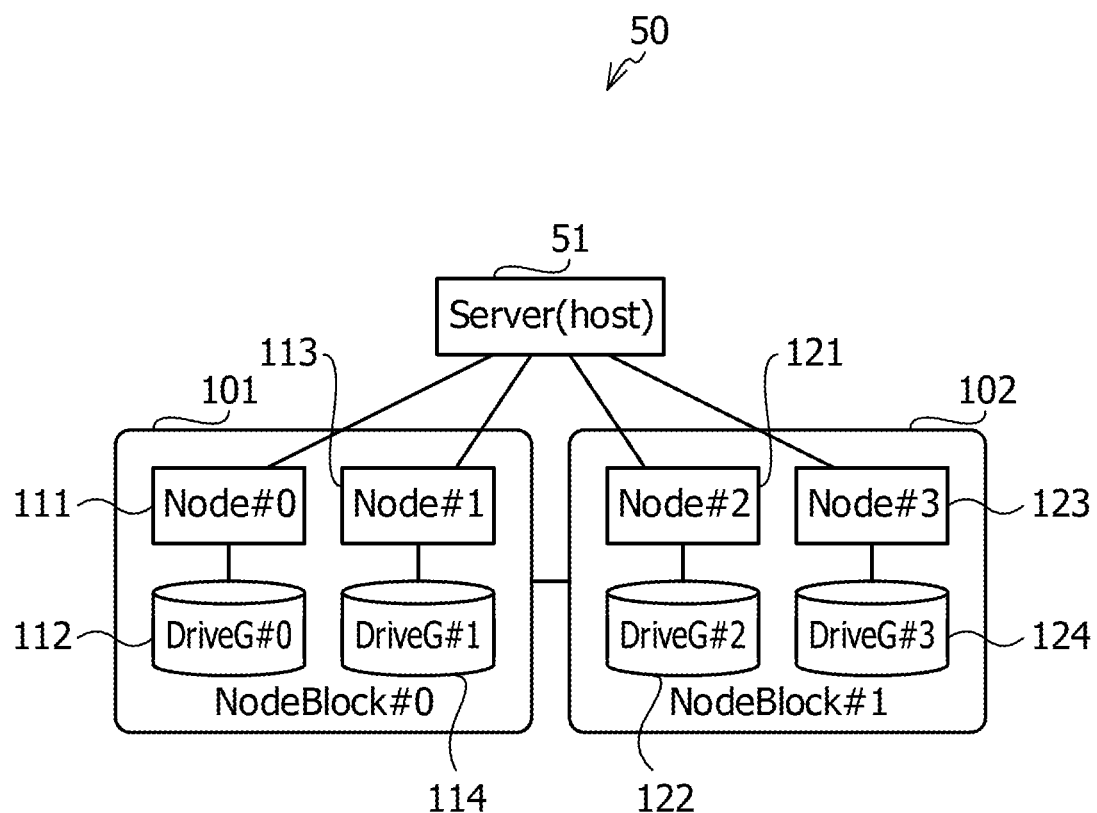
FIG. 2 is a diagram illustrating an example of a storage system according to a second embodiment.

A storage system according to the second embodiment will be described with reference to FIG. 2. FIG. 2 is a diagram illustrating an example of a storage system according to the second embodiment. Incidentally, a storage system 50 illustrated in FIG. 2 is an example of the storage system according to the second embodiment.

As illustrated in FIG. 2, the storage system 50 includes a server 51 and node blocks 101 and 102. The server 51 is, for example, a host computer. The node blocks 101 and 102 are, for example, storage devices each housed in one casing. In the following, for the convenience of description, the node blocks 101 and 102 may be individually represented as NodeBlock#0 and NodeBlock#1.

The node block 101 includes nodes 111 and 113 and drive groups 112 and 114. The nodes 111 and 113 are a computer that processes an I/O request received from the server 51. Incidentally, the nodes 111 and 113 are an example of the storage control apparatus. The drive groups 112 and 114 are a storage device such as an HDD, an SSD, a RAID device, or the like or a storage device set formed by coupling a plurality of storage devices.

The node block 102 includes nodes 121 and 123 and drive groups 122 and 124. The nodes 121 and 123 are a computer that processes an I/O request received from the server 51. Incidentally, the nodes 121 and 123 are an example of the storage control apparatus. The drive groups 122 and 124 are a storage device such as an HDD, an SSD, a RAID device, or the like or a storage device set formed by coupling a plurality of storage devices.

In the following, for the convenience of description, the nodes 111, 113, 121, and 123 may be individually represented as Node#0, Node#1, Node#2, and Node#3, and the drive groups 112, 114, 122, and 124 may be individually represented as DriveG#0, DriveG#1, DriveG#2, and DriveG#3.

The server 51 is coupled to the nodes 111, 113, 121, and 123 by using, for example, fibre channel (FC), internet small computer system interface (iSCSI), or the like. The node blocks 101 and 102 are coupled to each other by using, for example, FC, iSCSI, a local area network (LAN), or the like. The nodes 111, 113, 121, and 123 are individually coupled to the drive groups 112, 114, 122, and 124 by using FC, iSCSI, serial advanced technology attachment (SATA), or the like. Incidentally, these coupling methods are an example, and are not limited to the above-described example.

(Hardware of Server)

Figure 3:
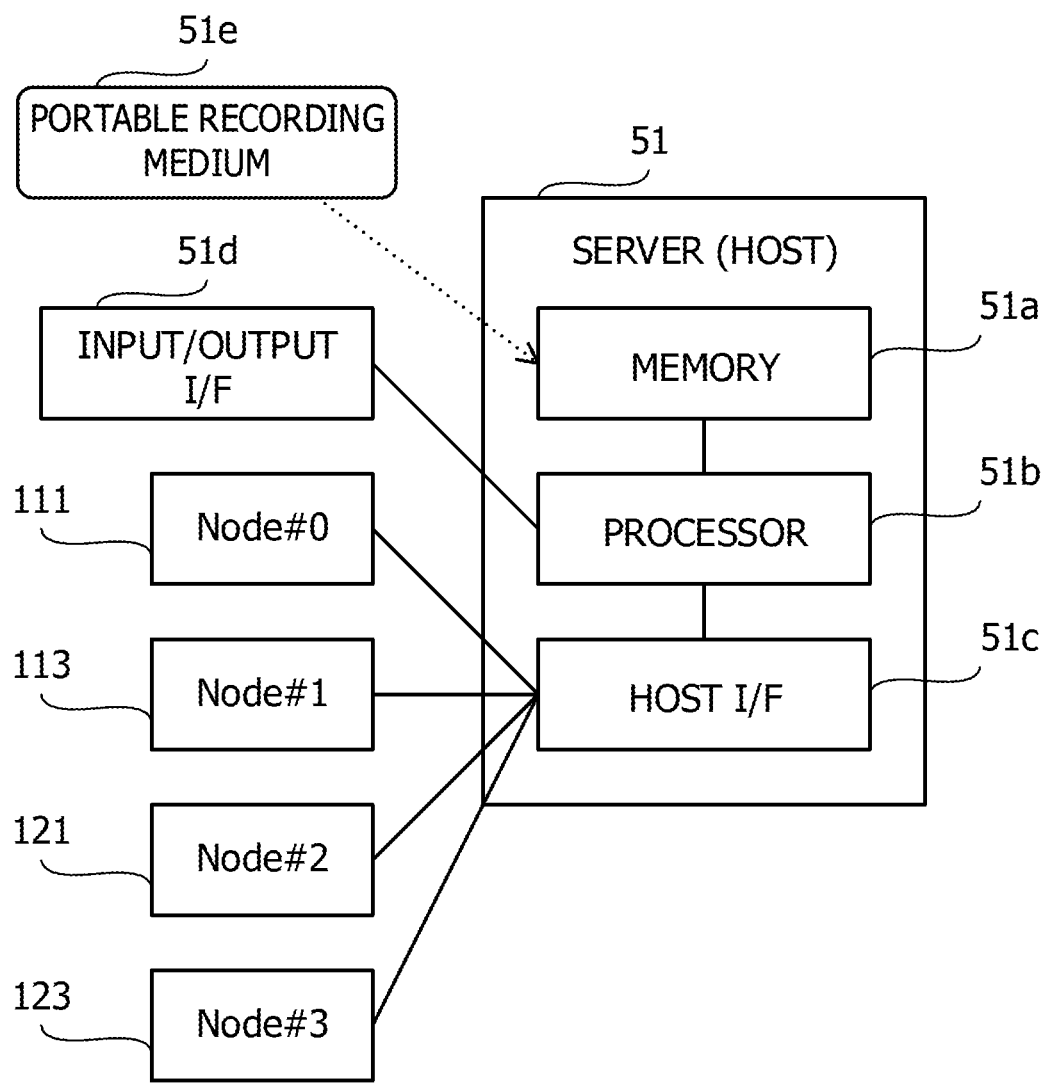
FIG. 3 is a block diagram illustrating an example of hardware that may implement functions of a server according to the second embodiment.

Hardware of the server 51 will be described with reference to FIG. 3. FIG. 3 is a block diagram illustrating an example of hardware that may implement functions of a server according to the second embodiment.

As illustrated in FIG. 3, the server 51 includes a memory 51a, a processor 51b, and a host interface (I/F) 51c.

The memory 51a is a volatile storage device such as a RAM or the like or a nonvolatile storage device such as an HDD, a flash memory, or the like. The processor 51b is an arithmetic circuit such as one or a plurality of CPUs, DSPs, ASICs, FPGAs, or the like. The host I/F 51c is a host bus adapter (HBA) or a communication interface for coupling a host computer (server 51 in the present example) to other apparatuses (storage devices or network apparatuses).

The processor 51b is coupled to an input-output I/F 51d. The input-output I/F 51d is an input device such as a keyboard, a mouse, a touch pad, or the like and a display device such as an electroluminescent display (ELD), a liquid crystal display (LCD), or the like. The processor 51b, for example, executes a program stored in the memory 51a.

Incidentally, the program is stored in the memory 51a in advance, or the processor 51b reads the program from a portable recording medium 51e such as an optical disk, a magnetic disk, a semiconductor memory, or the like, and stores the program in the memory 51a. The server 51 is coupled to the nodes 111, 113, 121, and 123 via the host I/F 51c.

(Hardware and Software Stack of Node)

Figure 4:
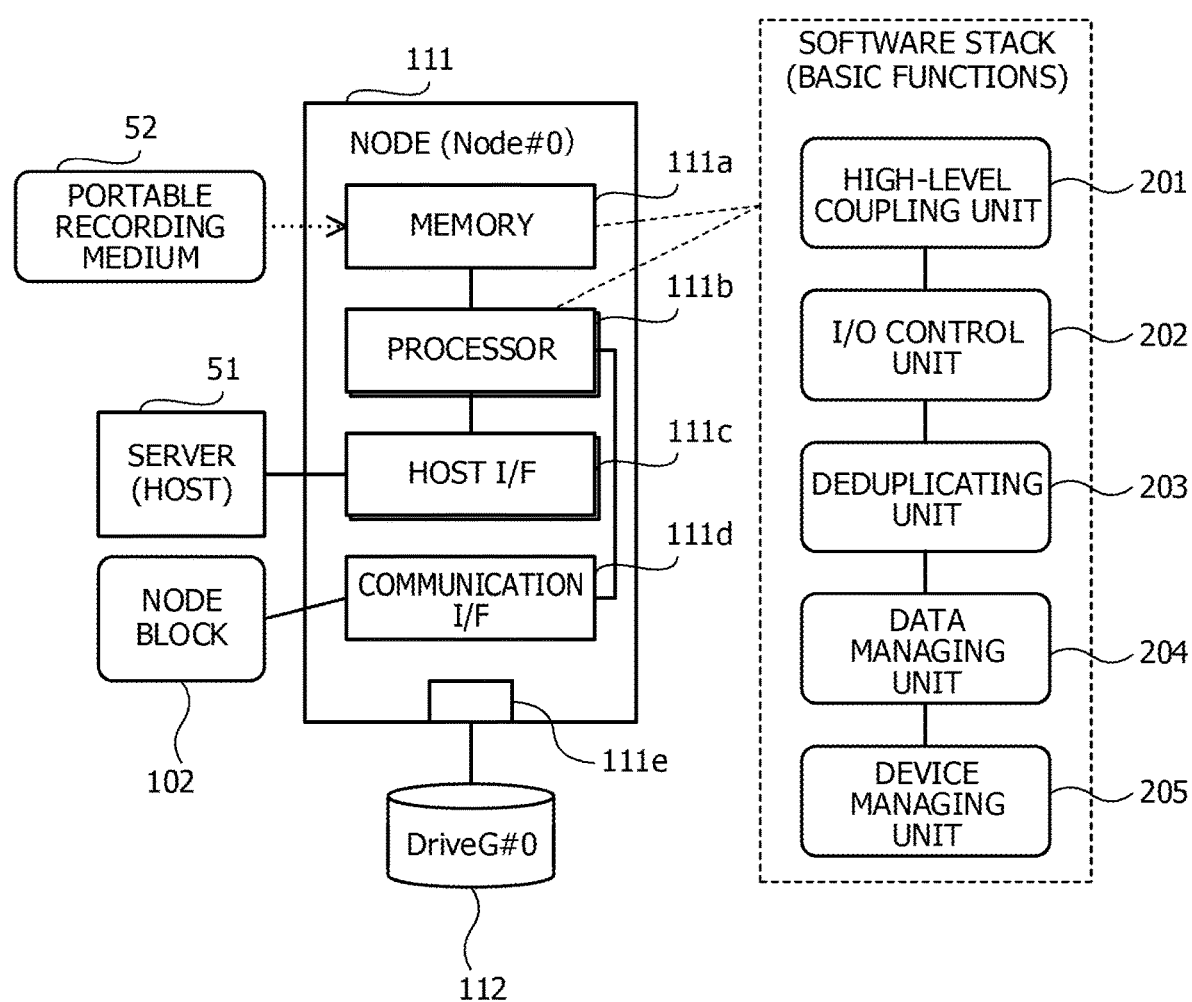
FIG. 4 is a block diagram illustrating an example of hardware and a software stack that may implement functions of a node according to the second embodiment.

Hardware and a software stack (basic functions) of the node 111 will be described with reference to FIG. 4. FIG. 4 is a block diagram illustrating an example of hardware and a software stack that may implement functions of a node according to the second embodiment. Incidentally, hardware and software stacks of the nodes 111, 113, 121, and 123 are substantially the same, and therefore description of the nodes 113, 121, and 123 will be omitted.

As illustrated in FIG. 4, the node 111 includes a memory 111a, a processor 111b, a host I/F 111c, a communication I/F 111d, and a coupling I/F 111e.

The memory 111a is a volatile storage device such as a RAM or the like or a nonvolatile storage device such as an HDD, a flash memory, or the like. The processor 111b is an arithmetic circuit such as a CPU, a DSP, an ASIC, an FPGA, or the like. The host I/F 111c is, for example, an HBA. In the example of FIG. 4, the node 111 includes a plurality of processors including the processor 111b and a plurality of host I/Fs including the host I/F 111c.

The communication I/F 111d is a communication interface (an FC adapter, an iSCSI adapter, or the like) used for communication with the node block 102. The coupling I/F 111e is a coupling interface (an FC adapter, a SATA adapter, or the like) for coupling to the drive group 112.

The processor 111b, for example, executes a program stored in the memory 111a. The program is stored in the memory 111a in advance, or the processor 111b reads the program from a portable recording medium 52 such as an optical disk, a magnetic disk, a semiconductor memory, or the like, and stores the program in the memory 111a. The server 51 and the node 111 are coupled to each other via the host I/F 111c. The node 111 and the node block 102 are coupled to each other via the communication I/F 111d.

Basic functions provided by the node 111 are implemented mainly by processing of software by the memory 111a and the processor 111b. As illustrated in FIG. 4, the node 111 includes, as elements of basic functions, a high-level coupling unit 201, an I/O control unit 202, a deduplicating unit 203, a data managing unit 204, and a device managing unit 205. Incidentally, a modification is possible in which at least a part of the elements are implemented by using dedicated hardware.

The high-level coupling unit 201 receives an I/O request (a WRITE I/O request or a READ I/O request) from the server 51. The I/O control unit 202 controls I/O processing according to the I/O request received by the high-level coupling unit 201. The deduplicating unit 203 determines the presence or absence of duplicate data. The data managing unit 204 performs compression and decompression of data, buffering, management of meta-information (information associating logical addresses with physical addresses) to be described later, and the like. The device managing unit 205 reads and writes data to and from the drive group 112.

(Data Writing Method)

A data writing method will be described in the following.

Figure 5:
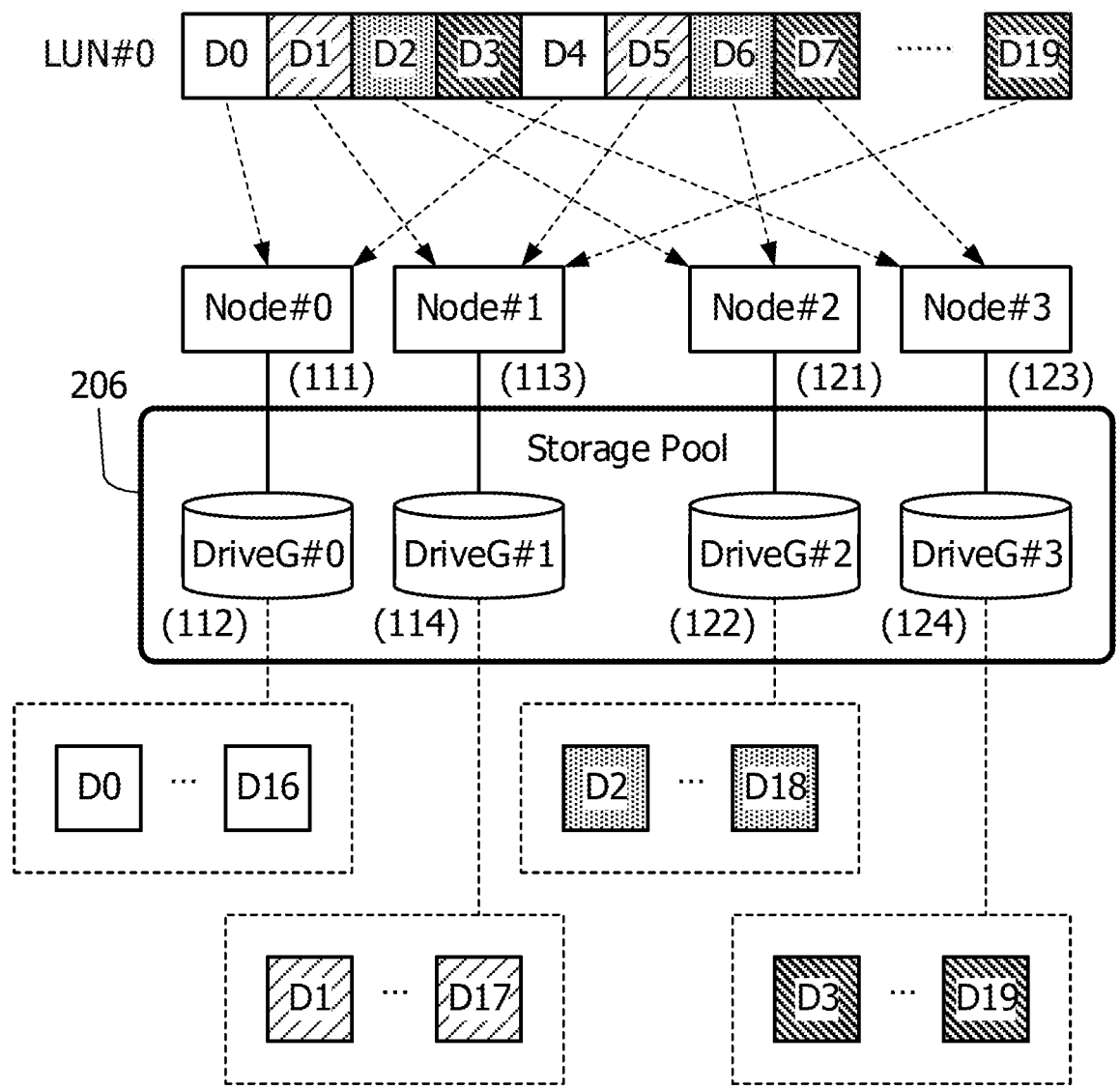
FIG. 5 is a diagram of assistance in explaining distributed arrangement of data in a plurality of nodes.

First, reference is made to FIG. 5. FIG. 5 is a diagram of assistance in explaining distributed arrangement of data in a plurality of nodes.

In the storage system 50, data (WRITE I/O data) to be written is divided into a plurality of pieces of data (real data) to distribute a load between nodes, and the plurality of pieces of data are arranged in the nodes 111, 113, 121, and 123 in a distributed manner. Then, the plurality of pieces of real data arranged in the nodes 111, 113, 121, and 123 in a distributed manner are individually written to the drive groups 112, 114, 122, and 124.

Incidentally, in the storage system 50, a storage pool 206 formed by bundling the drive groups 112, 114, 122, and 124 together is used as a physical area to which data is written. The positions of the data written within the storage pool 206 are managed by addresses (physical addresses) of the storage pool 206.

In the example of FIG. 5, WRITE I/O data of a zeroth logical area (hereinafter logical unit number (LUN) #0) is written to the storage pool 206. The WRITE I/O data is, for example, divided into real data D0, D1, . . . , D19. Then, Dk (k=p+4q; p=0, 1, 2, 3, q=0, 1, 2, 3, 4) is assigned to Node#p. When this distributed arrangement is applied, a load on the nodes 111, 113, 121, and 123 and the drive groups 112, 114, 122, and 124 is distributed.

Incidentally, data rearrangement is performed when the number of nodes is increased.

Figure 6:
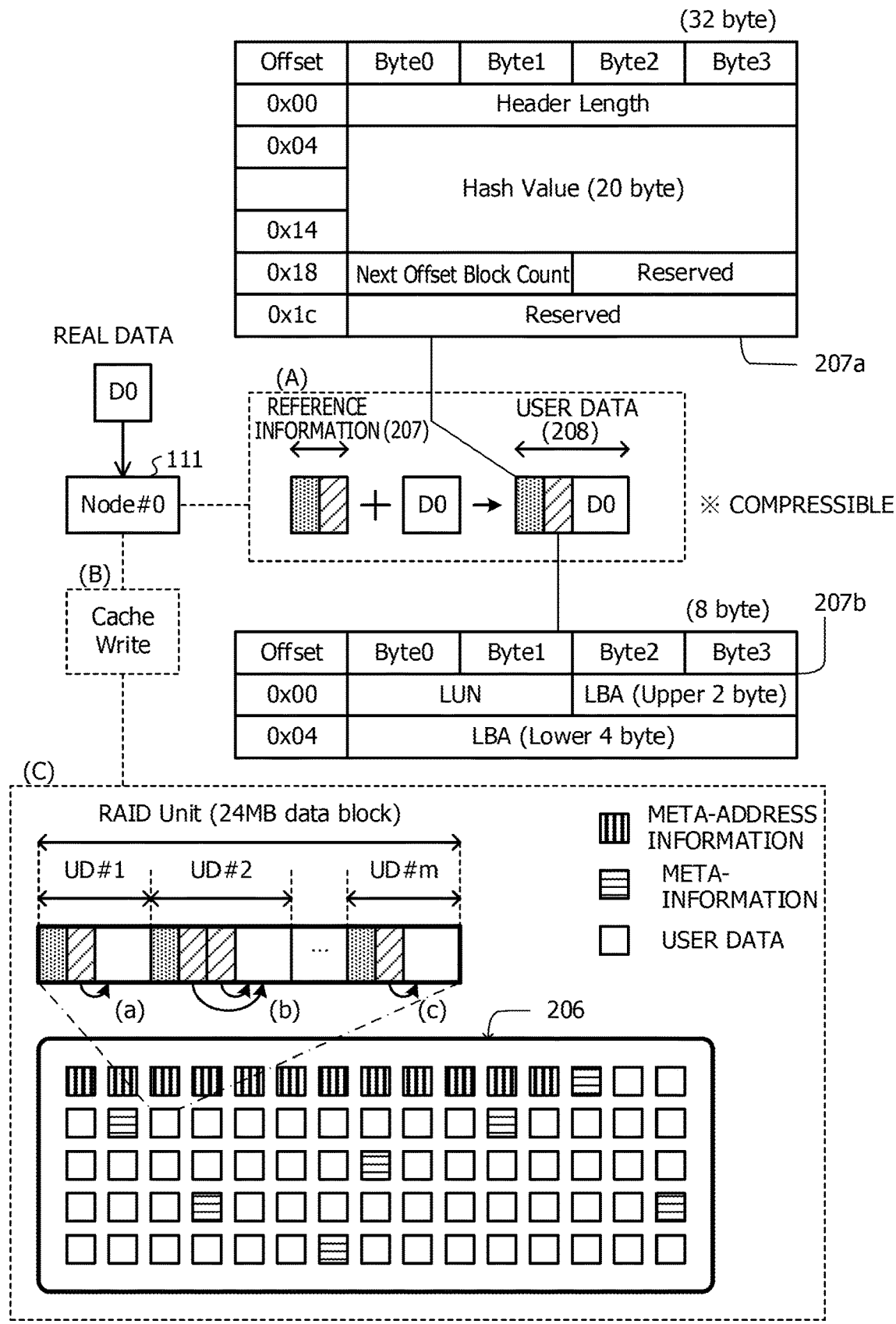
FIG. 6 is a diagram of assistance in explaining a method of managing user data and meta-information written to a storage pool.

Reference will next be made to FIG. 6. FIG. 6 is a diagram of assistance in explaining a method of managing user data and meta-information written to a storage pool.

As illustrated in (A) of FIG. 6, when real data D0 is written to the storage pool 206, the data managing unit 204 generates user data 208 by adding reference information 207 to the real data D0. The reference information 207 includes a super block (SB) 207a and reference LUN/logical block addressing (LBA) information 207b.

The SB 207a is, for example, set to 32 bytes. The SB 207a, for example, includes a header length (Header length) indicating the length of the reference information 207, a hash value (Hash Value) of the real data D0, and the like. The reference LUN/LBA information 207b is, for example, set to 8 bytes. The reference LUN/LBA information 207b, for example, includes the LUN of a logical area storing the real data D0 and an LBA indicating a storage position thereof. For example, the reference LUN/LBA information 207b includes information related to a logical storage destination of the real data D0.

When real data Dx having the same contents as the real data D0 is written, the data managing unit 204 generates reference LUN/LBA information 207b including the LUN of a logical area as a storage destination of the real data Dx and an LBA indicating a storage position thereof. In addition, the data managing unit 204 adds the reference LUN/LBA information 207b of the real data Dx to the user data 208 of the real data D0.

The data managing unit 204 temporarily stores the user data 208 in the memory 111a as in (B) of FIG. 6. Incidentally, the storage destination of the user data 208 may be a cache memory (not illustrated) different from the memory 111a. The data managing unit 204 performs control of additionally writing a plurality of pieces of user data corresponding to a plurality of respective pieces of real data to the memory 111a, and writing a data block having a given amount (for example, 24 MB) as a unit to the storage pool 206.

In the following, for the convenience of description, the unit of the written data may be referred to as a RAID unit. In the example of (C) of FIG. 6, data formed by coupling user data UD#1, UD#2, . . . , UD#m is written to the storage pool 206. Incidentally, arrows (a), (b), and (c) in (C) of FIG. 6 indicate correspondence relations between the reference LUN/LBA information 207b and the real data. In addition to the user data 208, meta-address information 209 and meta-information 210 to be described later are written to the storage pool 206.

The meta-information 210 is information associating a logical address with a physical address. The meta-address information 209 is information indicating the position of the meta-information 210 in the storage pool 206. The meta-address information 209 and the meta-information 210 are also written to the storage pool 206 in a RAID unit.

An area in which to write the meta-address information 209 is secured in advance in a given range from a head of the storage pool 206, for example. On the other hand, the user data 208 and the meta-information 210 are additionally written sequentially to the storage pool 206 in timing in which data for a RAID unit is collected. For example, as illustrated in (C) of FIG. 6, the meta-address information 209 is written in a row in the given range (given range from the head in the present example) of the storage pool 206, and the user data 208 and the meta-information 210 are mixed with each other.

The meta-address information 209 has a structure and contents as in FIG. 7. FIG. 7 is a diagram of assistance in explaining a structure and contents of meta-address information.

As illustrated in FIG. 7, the meta-address information 209 includes the identification information (Disk Pool No.) of the storage pool 206. The meta-address information 209 also includes identification information (RAID Unit No.) for identifying the RAID unit of the corresponding meta-information 210. The meta-address information 209 also includes positional information (RAID Unit Offset LBA) within the RAID unit in which the corresponding meta-information 210 is present. The meta-information 210 stored in the storage pool 206 may be retrieved by referring to the meta-address information 209.

Figure 8:
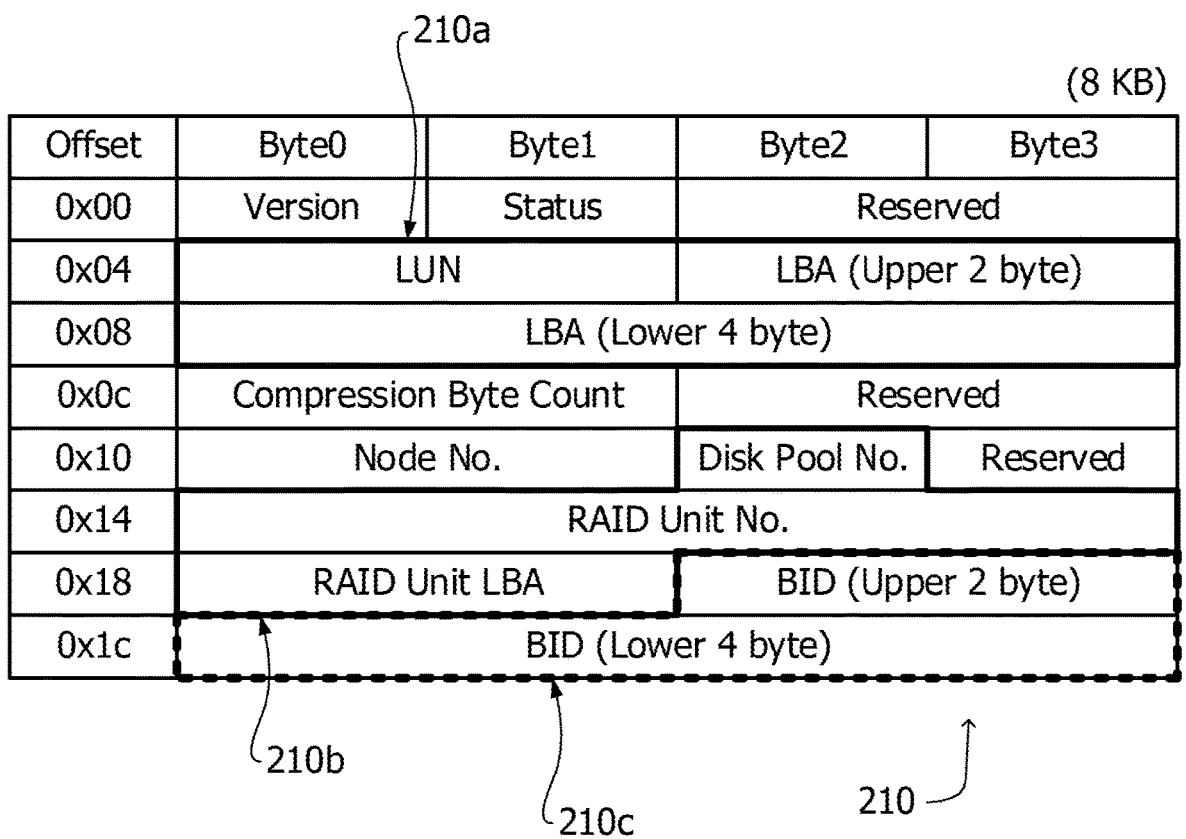
FIG. 8 is a diagram of assistance in explaining a structure and contents of meta-information.

The meta-information 210 has a structure and contents as illustrated in FIG. 8. FIG. 8 is a diagram of assistance in explaining a structure and contents of meta-information.

As illustrated in FIG. 8, the meta-information 210 includes logical address information 210a, physical address information 210b, a BID area 210c (within a broken line frame), and the like.

The logical address information 210a includes the LUN of a logical area storing the user data 208 and an LBA indicating a storage position thereof. The physical address information 210b also includes the identification information (Disk Pool No.) of the storage pool 206 storing the user data 208, the identification information (RAID Unit No.) of a RAID unit in the storage pool 206, and positional information (RAID Unit LBA) within the RAID unit. The BID area 210c is an area secured to store a BID included in a BCC.

Figure 9:
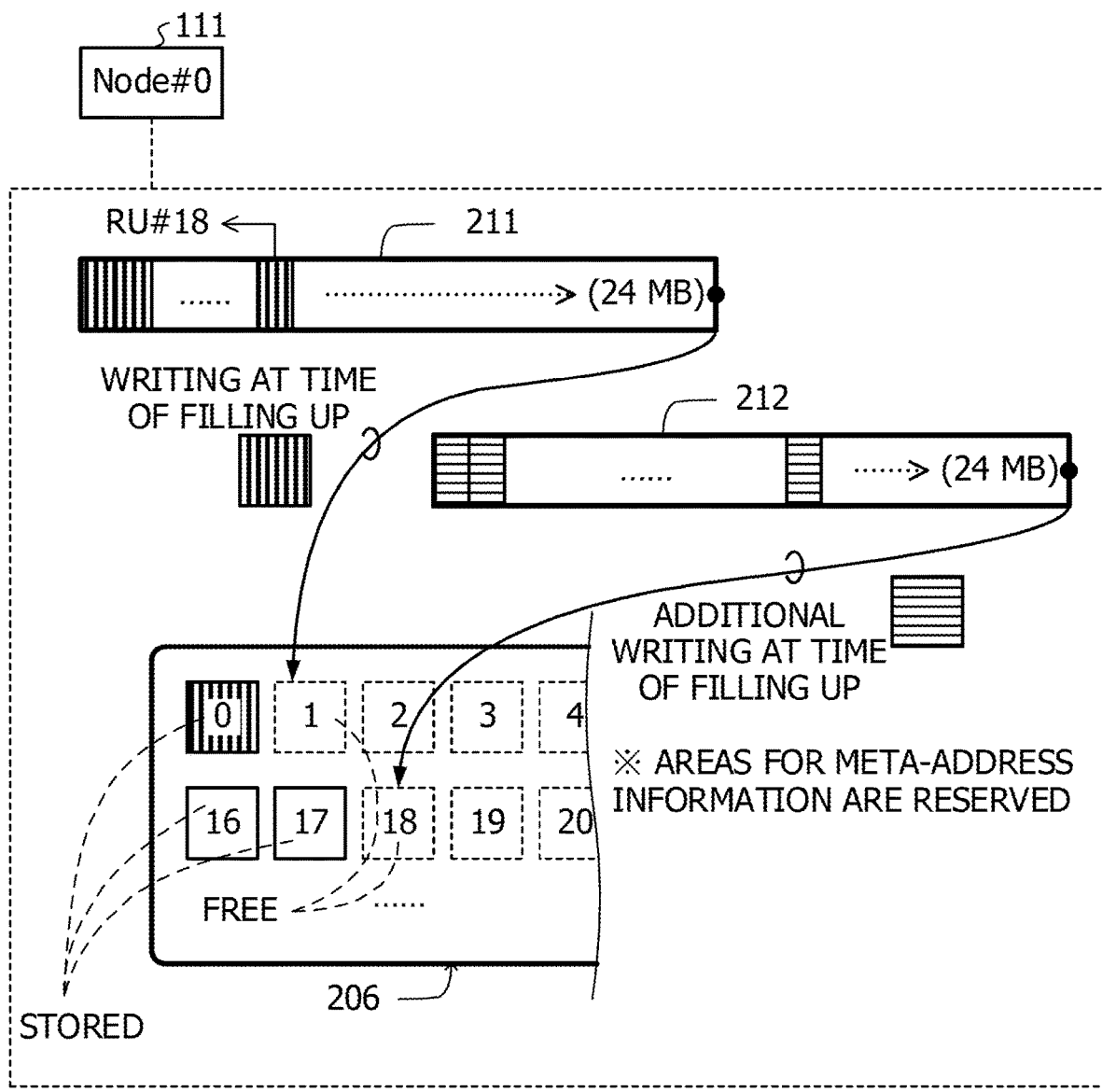
FIG. 9 is a diagram of assistance in explaining a method of writing meta-address information and meta-information to caches and a storage pool.

The meta-address information 209 and the meta-information 210 are cached in the memory 111a by a method illustrated in FIG. 9, and is written to the storage pool 206 in RAID units. FIG. 9 is a diagram of assistance in explaining a method of writing meta-address information and meta-information to caches and a storage pool.

As illustrated in FIG. 9, set as cache areas in the memory 111a are a meta-address cache 211 temporarily storing the meta-address information 209 and a meta-information cache 212 temporarily storing the meta-information 210. The meta-address cache 211 stores the meta-address information 209. The meta-information cache 212 stores the meta-information 210. Incidentally, the size of the meta-address cache 211 and the meta-information cache 212 is set to the size (for example, 24 MB) of a RAID unit.

When data (meta-information 210) in the meta-information cache 212 reaches a cache full state (filled state), the data is written to the storage pool 206, and the meta-information cache 212 is reset. For example, when meta-information 210 corresponding in amount to a RAID unit is collected, the meta-information 210 is written to the storage pool 206.

When RAID units up to a 17th RAID unit (RU#17) within the storage pool 206 already store data, for example, the data in the meta-information cache 212 is written to an 18th RAID unit (RU#18).

In this case, meta-address information 209 indicating that the meta-information 210 is stored in RU#18 is generated, and stored in the meta-address cache 211.

When data (meta-address information 209) in the meta-address cache 211 reaches a cache full state (filled state), the data is written to the storage pool 206, and the meta-address cache 211 is reset. For example, when meta-address information 209 corresponding in amount to a RAID unit is collected, the meta-address information 209 is written to the storage pool 206.

Incidentally, the data in the meta-address cache 211 is written to a free RAID unit among RAID units secured for meta-address information 209 (for example, an area of a given range from the head of the storage pool 206).

(Flow of Writing Processing)

Figure 10:
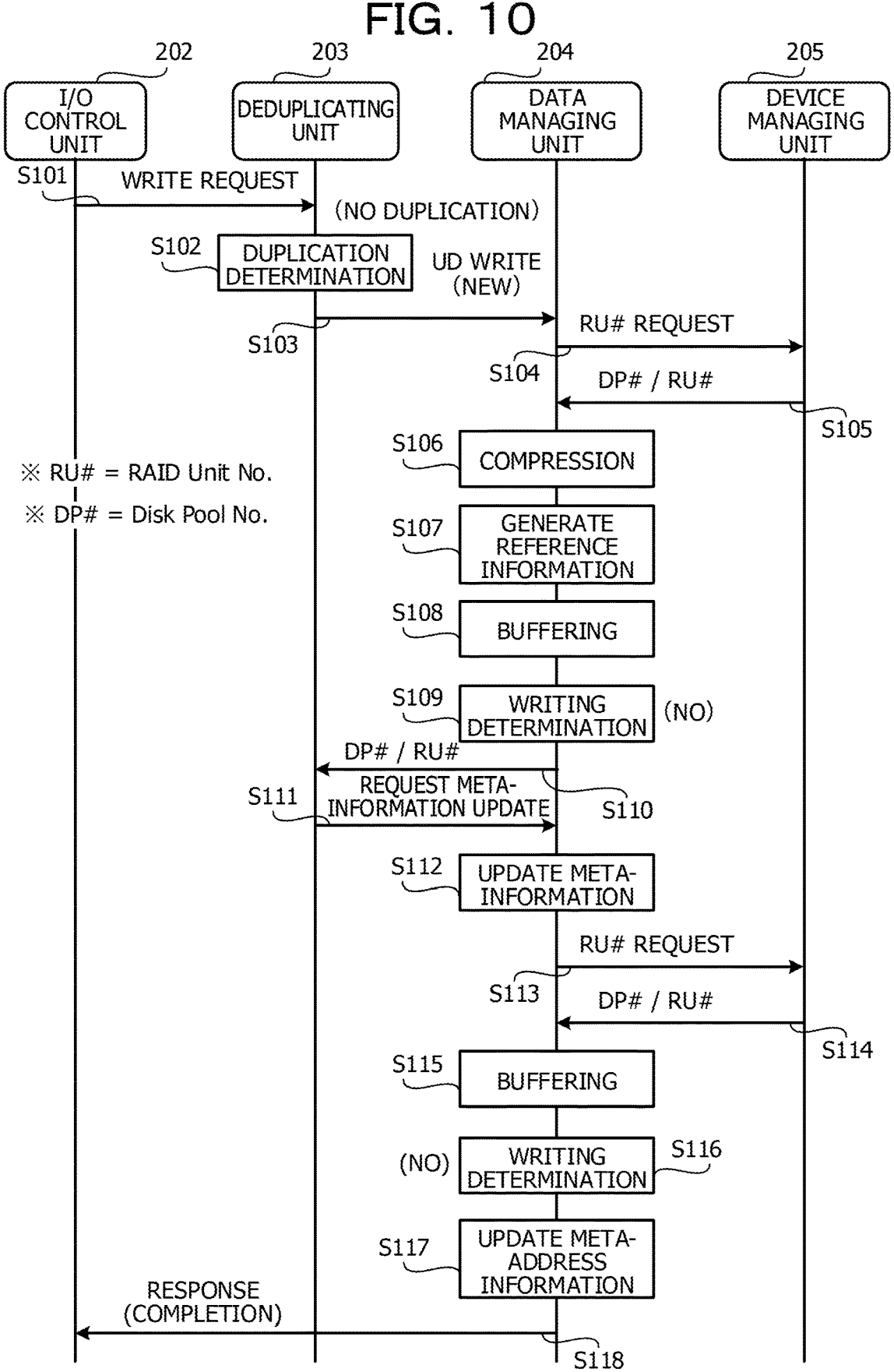
FIG. 10 is a sequence diagram of assistance in explaining a flow of writing processing (in a case where there is no duplication)
Figure 11:
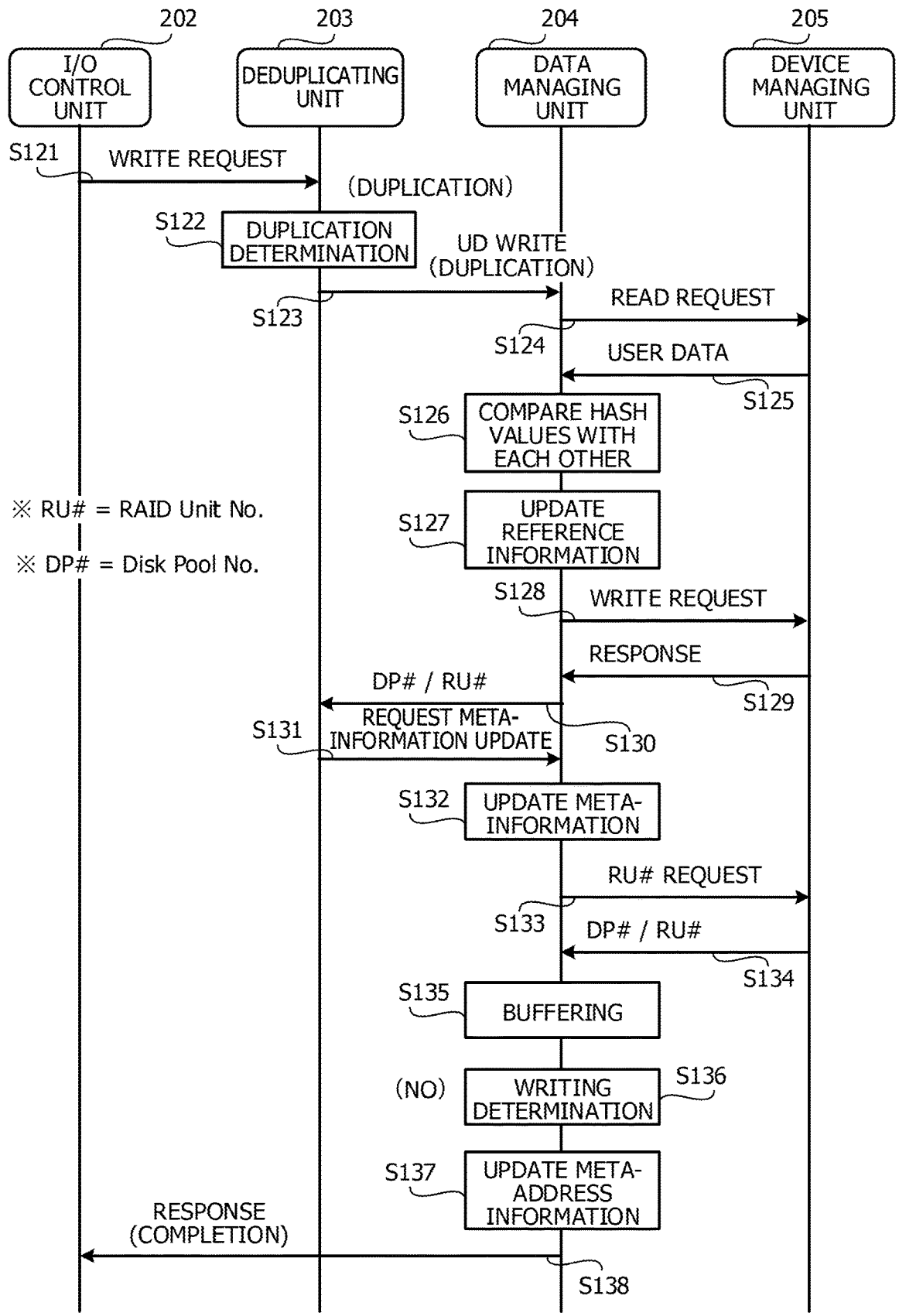
FIG. 11 is a sequence diagram of assistance in explaining a flow of writing processing (in a case where there is duplication)

A flow of writing processing in the node 111 is as in FIG. 10 and FIG. 11.

Reference will first be made to FIG. 10. FIG. 10 is a sequence diagram of assistance in explaining a flow of writing processing (in a case where there is no duplication).

(S101) The I/O control unit 202 receives a request to write real data (WRITE request) from the server 51 via the high-level coupling unit 201, and outputs the WRITE request to the deduplicating unit 203 together with the real data.

(S102) The deduplicating unit 203 determines whether or not the real data as a target of the WRITE request is a target of deduplication. For example, the deduplicating unit 203 extracts a hash value from the SB 207a of user data 208 present in the memory 111a or the storage pool 206, and compares the hash value with the hash value of the real data as the target of the WRITE request. When the hash values coincide with each other, the deduplicating unit 203 determines that there is duplicate real data. In the example of FIG. 10, the deduplicating unit 203 determines that there is no duplication.

(S103) The deduplicating unit 203 requests the data managing unit 204 to write user data 208 anew (UD WRITE).

(S104) The data managing unit 204 requests the identification information (RU#) of a RAID unit as the writing destination of the WRITE request from the device managing unit 205.

(S105) The device managing unit 205 outputs, to the data managing unit 204, the identification information (RU#) of a RAID unit as the writing destination of the WRITE request and the identification information (DP#) of the storage pool 206 in which the RAID unit is present.

(S106) The data managing unit 204 compresses the real data as the target of the WRITE request. Incidentally, a modification may be made to change to a setting such that the real data is written to the storage pool 206 in an uncompressed state.

(S107 and S108) The data managing unit 204 generates reference LUN/LBA information 207b using DP# and RU# output from the device managing unit 205, and generates reference information 207 by combining the reference LUN/LBA information 207b with an SB 207a. The data managing unit 204 then stores user data 208 obtained by combining the real data after the compression with the reference information 207 in the memory 111a (buffering).

(S109) The data managing unit 204 determines whether or not user data 208 present in the memory 111a may be written to the storage pool 206 in a RAID unit. When the user data 208 may be written, processing of writing the user data 208 to the storage pool 206 is performed. In the example of FIG. 10, the data amount of the user data 208 present in the memory 111a does not reach the unit of a RAID unit, and it is therefore determined that the user data 208 is not to be written (NO).

(S110 and S111) The data managing unit 204 outputs DP# and RU# output from the device managing unit 205 to the deduplicating unit 203. Receiving DP# and RU#, the deduplicating unit 203 recognizes the writing destination and completion of writing of the user data 208, and requests the data managing unit 204 to update meta-information 210.

(S112) The data managing unit 204 updates the meta-information 210 based on DP# and RU# output from the device managing unit 205.

(S113 and S114) The data managing unit 204 requests, from the device managing unit 205, the identification information (RU#) of a RAID unit as the writing destination of the meta-information 210 corresponding to the buffered user data 208. Receiving this request, the device managing unit 205 outputs the identification information (DP#) of the storage pool 206 and the identification information (RU#) of the RAID unit as the writing destination of the meta-information 210 to the data managing unit 204.

(S115 and S116) The data managing unit 204 stores the meta-information 210 corresponding to the buffered user data 208 in the meta-information cache 212 (memory 111a) (buffering). The data managing unit 204 then determines whether or not the meta-information cache 212 is in a cache full state (writing determination). In a case of the cache full state, control of writing data in the meta-information cache 212 to the storage pool 206 is performed. In the example of FIG. 10, it is determined that the data in the meta-information cache 212 is not to be written (NO).

(S117 and S118) The data managing unit 204 updates meta-address information 209 using DP# and RU# received from the device managing unit 205. The data managing unit 204 then notifies the I/O control unit 202 of completion of writing of the user data 208 as a response to the WRITE request. The I/O control unit 202 returns a writing completion response to the server 51 via the high-level coupling unit 201. When the processing of S118 is completed, the series of processing illustrated in FIG. 10 is ended.

Reference will next be made to FIG. 11. FIG. 11 is a sequence diagram of assistance in explaining a flow of writing processing (in a case where there is duplication).

(S121) The I/O control unit 202 receives a request to write real data (WRITE request) from the server 51 via the high-level coupling unit 201, and outputs the WRITE request to the deduplicating unit 203 together with the real data.

(S122) The deduplicating unit 203 determines whether or not the real data as the target of the WRITE request is a target of deduplication.

For example, the deduplicating unit 203 extracts a hash value from the SB 207a of user data 208 present in the memory 111a or the storage pool 206, and compares the hash value with the hash value of the real data as the target of the WRITE request. When the hash values coincide with each other, the deduplicating unit 203 determines that there is duplicate real data. In the example of FIG. 11, the deduplicating unit 203 determines that there is duplication.

(S123) The deduplicating unit 203 instructs the data managing unit 204 to write duplicate user data 208 (UD WRITE).

(S124) The data managing unit 204 requests the device managing unit 205 to perform processing of reading the user data 208 including the same data as the real data as the target of the WRITE request from the storage pool 206 (READ request).

Incidentally, when the user data 208 to be read is present in the memory 111a, the data managing unit 204 may omit the READ request to the device managing unit 205, and read the user data 208 from the memory 111a.

(S125) The device managing unit 205 reads the user data 208 in response to the READ request, and outputs the read user data 208 to the data managing unit 204.

(S126) The data managing unit 204 compares the hash value of an SB 207a included in the user data 208 received from the device managing unit 205 with a hash value generated from the real data as the target of the WRITE request. When the hash values do not coincide with each other, the data managing unit 204 performs error processing. In the example of FIG. 11, the hash values coincide with each other.

(S127) The data managing unit 204 generates reference LUN/LBA information 207b corresponding to the real data as the target of the WRITE request, and adds the reference LUN/LBA information 207b to the reference information 207 of the user data 208 received from the device managing unit 205 (reference information update).

(S128) The data managing unit 204 requests the identification information (RU#) of a RAID unit as the writing destination of the WRITE request from the device managing unit 205.

(S129) The device managing unit 205 outputs, to the data managing unit 204, the identification information (RU#) of a RAID unit as the writing destination of the WRITE request and the identification information (DP#) of the storage pool 206 in which the RAID unit is present.

(S130 and S131) The data managing unit 204 outputs DP# and RU# output from the device managing unit 205 to the deduplicating unit 203. Receiving DP# and RU#, the deduplicating unit 203 recognizes the writing destination and completion of writing of the user data 208, and requests the data managing unit 204 to update meta-information 210.

(S132) The data managing unit 204 updates the meta-information 210 based on DP# and RU# output from the device managing unit 205.

(S133 and S134) The data managing unit 204 requests, from the device managing unit 205, the identification information (RU#) of a RAID unit as the writing destination of the meta-information 210 corresponding to the buffered user data 208. Receiving this request, the device managing unit 205 outputs the identification information (DP#) of the storage pool 206 and the identification information (RU#) of the RAID unit as the writing destination of the meta-information 210 to the data managing unit 204.

(S135 and S136) The data managing unit 204 stores the meta-information 210 corresponding to the buffered user data 208 in the meta-information cache 212 (memory 111a) (buffering). The data managing unit 204 then determines whether or not the meta-information cache 212 is in a cache full state (writing determination). In a case of the cache full state, control of writing data in the meta-information cache 212 to the storage pool 206 is performed. In the example of FIG. 11, it is determined that the data in the meta-information cache 212 is not to be written (NO).

(S137 and S138) The data managing unit 204 updates meta-address information 209 using DP# and RU# received from the device managing unit 205. The data managing unit 204 then notifies the I/O control unit 202 of completion of writing of the user data 208 as a response to the WRITE request. The I/O control unit 202 returns a writing completion response to the server 51 via the high-level coupling unit 201. When the processing of S138 is completed, the series of processing illustrated in FIG. 11 is ended.

(Flow of Reading Processing)

Figure 12:
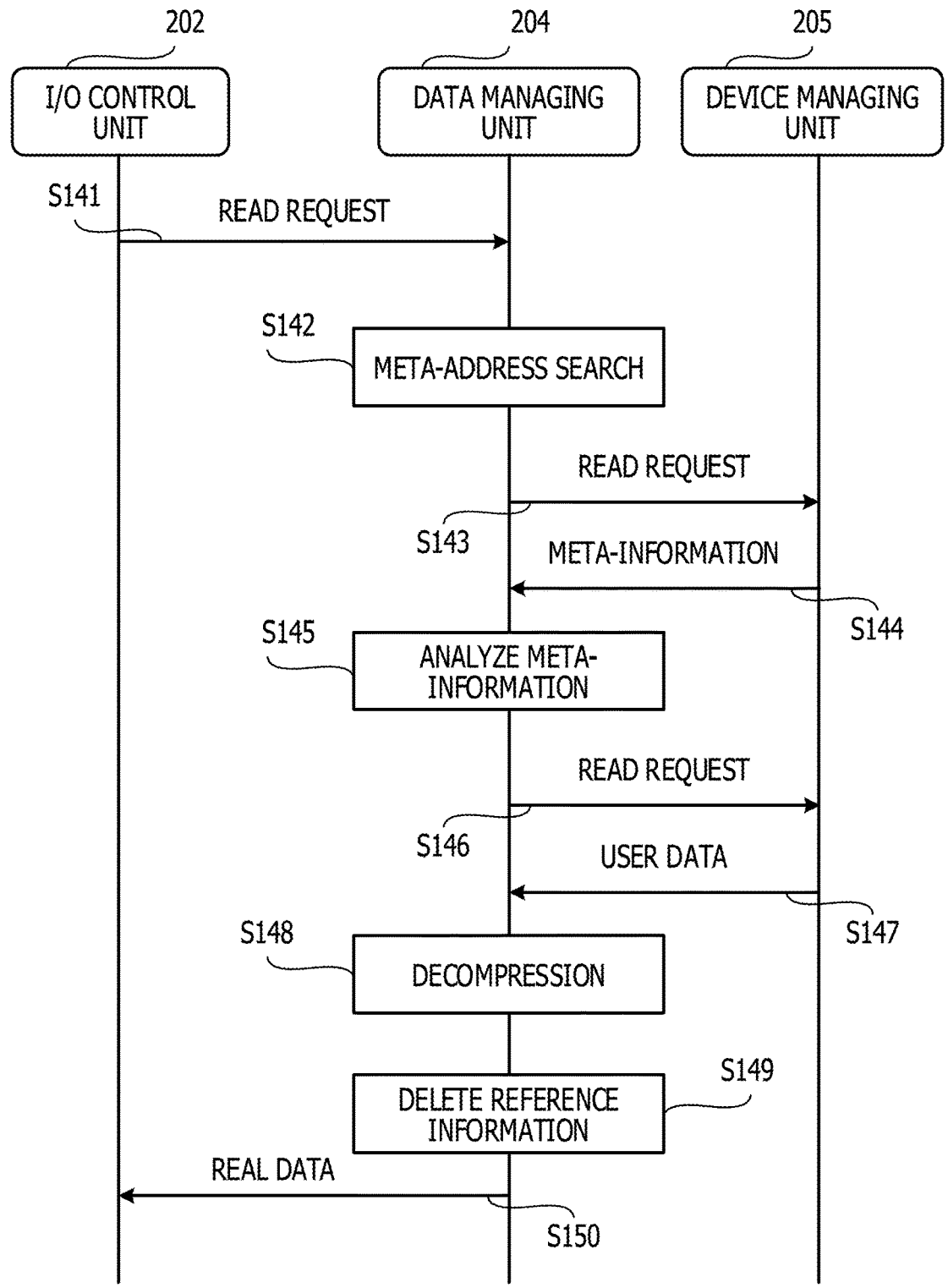
FIG. 12 is a sequence diagram of assistance in explaining a flow of reading processing.

A flow of reading processing in the node 111 is as in FIG. 12. FIG. 12 is a sequence diagram of assistance in explaining a flow of reading processing.

(S141) The I/O control unit 202 receives a request to read real data (READ request) from the server 51 via the high-level coupling unit 201, and outputs the READ request to the data managing unit 204.

(S142 and S143) The data managing unit 204 searches for meta-address information 209 including information related to the storage pool 206 and a RAID unit in which meta-information 210 is present and the like. Then, the data managing unit 204 notifies the meta-address information 209 to the device managing unit 205, and requests the device managing unit 205 to read the meta-information 210 (READ request).

(S144) The device managing unit 205 reads the meta-information 210 from the storage pool 206 in response to the READ request received from the data managing unit 204, and outputs the meta-information 210 to the data managing unit 204. Incidentally, when the corresponding meta-information 210 is present in the meta-address cache 211, the device managing unit 205 outputs the meta-information 210 read from the meta-address cache 211 to the data managing unit 204.

(S145 and S146) The data managing unit 204 analyzes the meta-information 210, and identifies physical address information 210b including the storage pool 206, a RAID unit, and a physical address where data as the target of the READ request received from the I/O control unit 202 is present or the like. Then, the data managing unit 204 notifies the physical address information 210b to the device managing unit 205, and requests the device managing unit 205 to read user data 208 (READ request).

(S147) The device managing unit 205 reads the user data 208 from the storage pool 206 in response to the READ request received from the data managing unit 204, and outputs the user data 208 to the data managing unit 204. Incidentally, when the corresponding user data 208 is cached in the memory 111a, the device managing unit 205 outputs the user data 208 read from the memory 111a to the data managing unit 204.

(S148 and S149) In a case where the user data 208 is compressed, the data managing unit 204 decompresses the user data 208. In addition, the data managing unit 204 restores real data by deleting reference information 207 added to the user data 208.

(S150) The data managing unit 204 outputs the restored real data to the I/O control unit 202 as a response to the READ request. The I/O control unit 202 outputs the real data to the server 51 via the high-level coupling unit 201. When the processing of S150 is completed, the series of processing illustrated in FIG. 12 is ended.

In the above description, for the convenience of description, basic functions of the node 111 are represented as a software stack, and data writing and reading operations are described with elements of the software stack as units. In addition, description has been made of a mechanism in which the user data 208 and the meta-information 210 are additionally written to the storage pool 206 in RAID units. Incidentally, the writing of the meta-address information 209 may be overwriting.

The application of a mechanism as described above contributes to realization of a system that reduces frequency of writing to recording media forming the storage pool 206, and may therefore be expected to lead to a reduction in cost, an improvement in operation efficiency, and the like when recording media whose number of times of writing is limited, such as SSDs and the like, are used. However, the storage system 50 described above is an example of a system to which the technology of the second embodiment is applicable, and is susceptible of modifications in which a part of functions are omitted and modifications in which other functions are added.

(Supplement: Deduplication)

Figure 13:
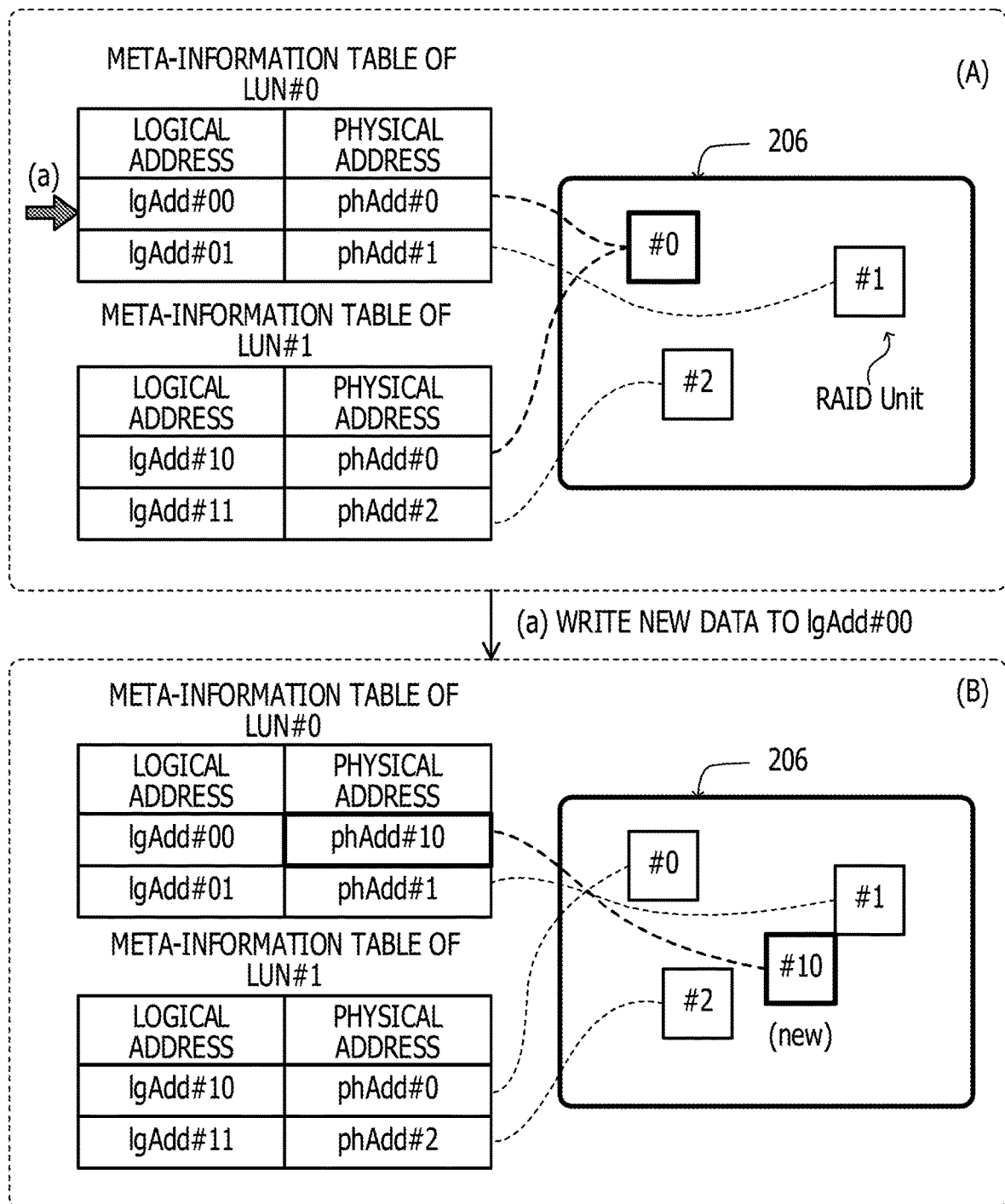
FIG. 13 is a diagram of assistance in explaining deduplication.

A deduplicating function (deduplicating unit 203) will be further described in the following with reference to FIG. 13. FIG. 13 is a diagram of assistance in explaining deduplication. Incidentally, in the example of FIG. 13, for the convenience of description, a set of meta-information 210 associating logical address information 210a with physical address information 210b is expressed in a table form (meta-information table).

In (A) of FIG. 13, a meta-information table of LUN#0 associates logical addresses IgAdd#00 and IgAdd#01 of LUN#0 with physical addresses phAdd#0 and phAdd#1 of the storage pool 206 individually. A meta-information table of LUN#1 associates logical addresses IgAdd#10 and IgAdd#11 of LUN#1 with physical addresses phAdd#0 and phAdd#2 of the storage pool 206 individually.

Referring to the meta-information tables of LUN#0 and LUN#1, the same physical address phAdd#0 is associated with the logical addresses IgAdd#00 and IgAdd#10. For example, deduplication is applied to data present at the physical address phAdd#0, and in both of cases of reading data at the logical address IgAdd#00 and reading data at the logical address IgAdd#10, the data at the physical address phAdd#0 is read.

When new data is written to the logical address IgAdd#00 in the above-described state (new data WRITE) as in (a), the deduplicating unit 203 updates the meta-information table of LUN#0 as in (B). For example, when the writing destination of the new data is a physical address phAdd#10, the deduplicating unit 203 associates the logical address IgAdd#00 with the physical address phAdd#10. The device managing unit 205 writes the new data to the physical address phAdd#10 of the storage pool 206.

As described above, deduplication is performed by rewriting the meta-information table (set of meta-information 210), and at a time of new data WRITE, the data having the logical address (logical address IgAdd#10) as the reference source of the duplicate data is left. The writing processing may be thereby improved in efficiency. The application of the above-described method may reduce the number of times of writing to the storage pool 206 as compared with a case where the duplicate data is deleted after being once written to the storage pool 206, for example, and thus contributes to lengthening the life of recording media whose number of times of writing is limited, such as SSDs and the like.

The storage system according to the second embodiment has been described above.

[2-2. Bcc Management]

In the storage system 50 described above, a check code (BCC) for checking for a data error is added to each block as a unit of I/O processing. When the BCC is added, data may be checked for an error that may occur at a time of copy processing performed within the node 111 or READ/WRITE processing on the storage pool 206.

The size of a block as a unit of I/O processing is, for example, set with the sector size (for example, 512 bytes or 4096 bytes) of a recording medium (an HDD, an SSD, or the like) forming the storage pool 206 as a reference. In a case where the size of data as a target of I/O processing is 512 bytes, and the size of the BCC is 8 bytes, a data block including the BCC is a 520-byte block. A data block having a size of X bytes may hereinafter be referred to as an X-byte block.

Figure 14:
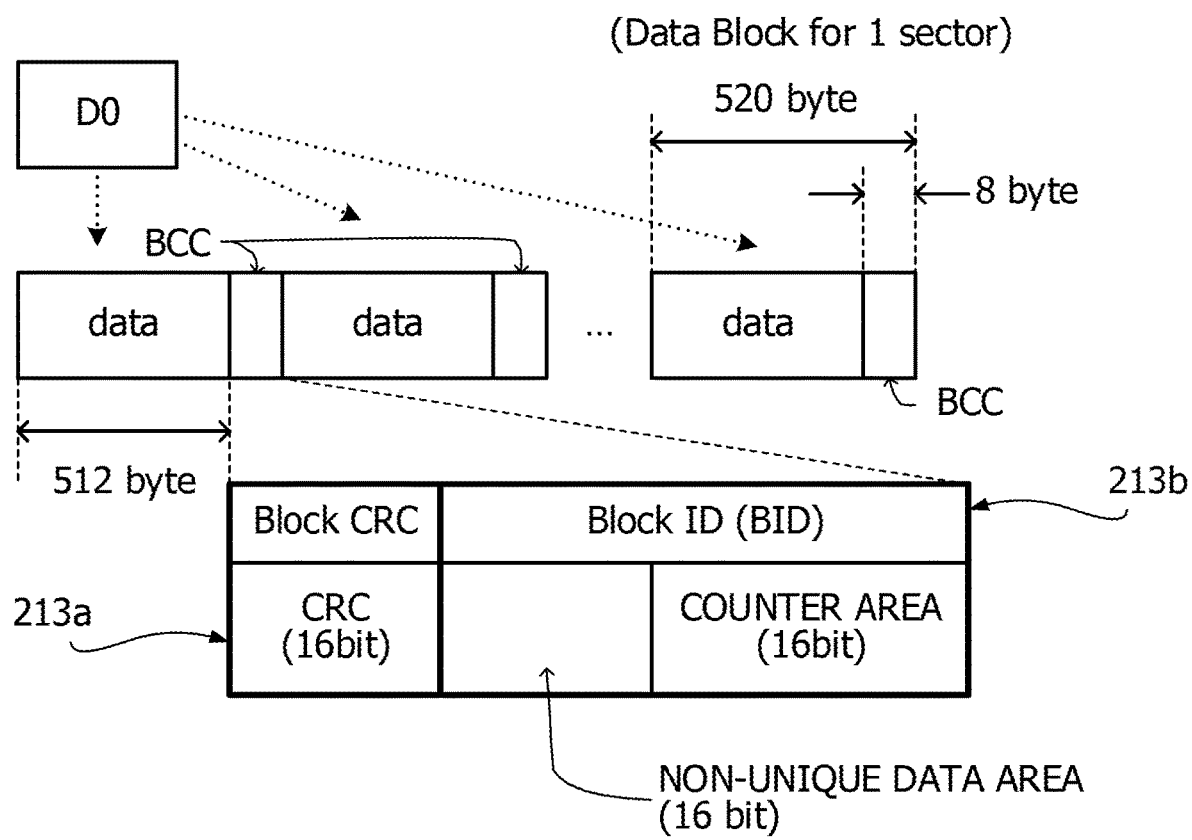
FIG. 14 is a diagram of assistance in explaining a structure and contents of block check codes (BCCs)

The BCC has a structure and contents as in FIG. 14. FIG. 14 is a diagram of assistance in explaining a structure and contents of the BCC. FIG. 14 illustrates a method of generating a plurality of 520-byte blocks by adding a BCC of 8 bytes to each of a plurality of 512-byte blocks. Data as a target of WRITE I/O processing (for example, an 8-KB block as a managing unit) is divided into 512-byte blocks, and BCCs are added as illustrated in FIG. 14. Then, a set of 520-byte blocks forms real data (real data D0 in the example of FIG. 14).

The BCC includes a block CRC 213a and a BID 213b. The area of the block CRC 213a, for example, stores a 16-bit CRC generated from the 512-byte block to which the CRC is added. The BID 213b includes information for checking a data position within the logical area. The area of the BID 213b includes a counter area (16 rear bits) storing a count value (corresponding to 32 least significant bits when an LBA is expressed by Big Endian) corresponding to the LBA and a non-unique data area (16 front bits) storing data other than the count value.

The data in the above-described non-unique data area is common to the 520-byte blocks included in the 8-KB block. On the other hand, the above-described count value differs according to the data position of the 512-byte block. Therefore, the above-described count value is data unique to the individual 512-byte block. In addition, the above-described count value is a value sequentially incremented by one with the count value of a 520-byte block present at the head of the 8-KB block as a reference.

When a count value present in the BCC of the 520-byte block at the head is n, for example, a count value present in the BCC of a next 520-byte block is (n+1). For example, with the 520-byte block at the head as a zeroth block, a count value present in the BCC of an mth 520-byte block is (n+m). Therefore, when the count value present in the BCC of the 520-byte block at the head is known, the count value present in the BCC of the mth 520-byte block may be restored by calculation.

As described above, a BCC added to a 512-byte block includes data unique to the 512-byte block. Therefore, when deduplication is performed targeting data blocks (520-byte blocks) after BCCs are added thereto, data blocks that become targets of deduplication are reduced. Accordingly, the deduplicating unit 203 performs deduplication targeting 512-byte blocks or data other than BIDs 213b in 520-byte blocks. The deduplicating unit 203 then stores a BID 213b present in the BCC of the 520-byte block located at the head of the 8-KB block in the BID area 210c of the meta-information 210.

Incidentally, the meta-information 210 described above is, for example, generated for each 8-KB block. When the deduplicating unit 203 performs deduplication at a time of WRITE I/O processing, the deduplicating unit 203 extracts a BID 213b present in the BCC of a 520-byte block located at the head of an 8-KB block, and stores the extracted BID 213b in the BID area 210c of the meta-information 210.

At a time of READ I/O processing, the deduplicating unit 203 reads the BID 213b from the BID area 210c of the meta-information 210, and restores the BCCs of 520-byte blocks located at other than the head of the 8-KB block by using the read BID 213b. The count values of the 520-byte blocks located at other than the head of the 8-KB block may be restored by calculation. Therefore, the deduplicating unit 203 restores the BCC of each 520-byte block using the count value restored by calculation, the block CRC 213a of the read BID 213b, and the non-unique data area of the BID 213b.

An amount of usage of the memory 111a may be saved by storing only the BID 213b of the 520-byte block located at the head of the 8-KB block in the meta-information 210, and restoring the BCCs of the other 520-byte blocks by calculation, as described above. In addition, the management of the BID is facilitated by storing the BID in the meta-information 210.

It is to be noted that while data sizes such as 8 KB and the like are illustrated for the convenience of description, the settings of the data sizes may be modified. In addition, in the above description, the BCCs of the 512-byte blocks corresponding to the real data D0 have been described. However, BCC management and deduplication by methods similar to the above-described methods may be performed also for the user data 208 obtained by adding the reference information 207 to the real data D0.

Incidentally, when BCCs are added to 512-byte blocks as described above, a difference occurs between the sector size of a format adopted by a recording medium such as an HDD, an SSD, or the like and the data size (520 bytes) of writing targets, and thus a problem may occur in access. Therefore, in the storage system 50, the data managing unit 204 performs processing of size conversion of a set of 520-byte blocks into a set of 512-byte blocks.

The above-described size conversion resolves the difference between the sector size of the recording medium and the data size (512 bytes) of the writing targets. It is thus possible to avoid a risk of a problem occurring in access to the recording media forming the storage pool 206. In the following, further description will be made of processing at a time of WRITE I/O and processing at a time of READ I/O, the processing including the above-described processing of BCC management and size conversion.

(Processing at Time of WRITE I/O)

Figure 15:
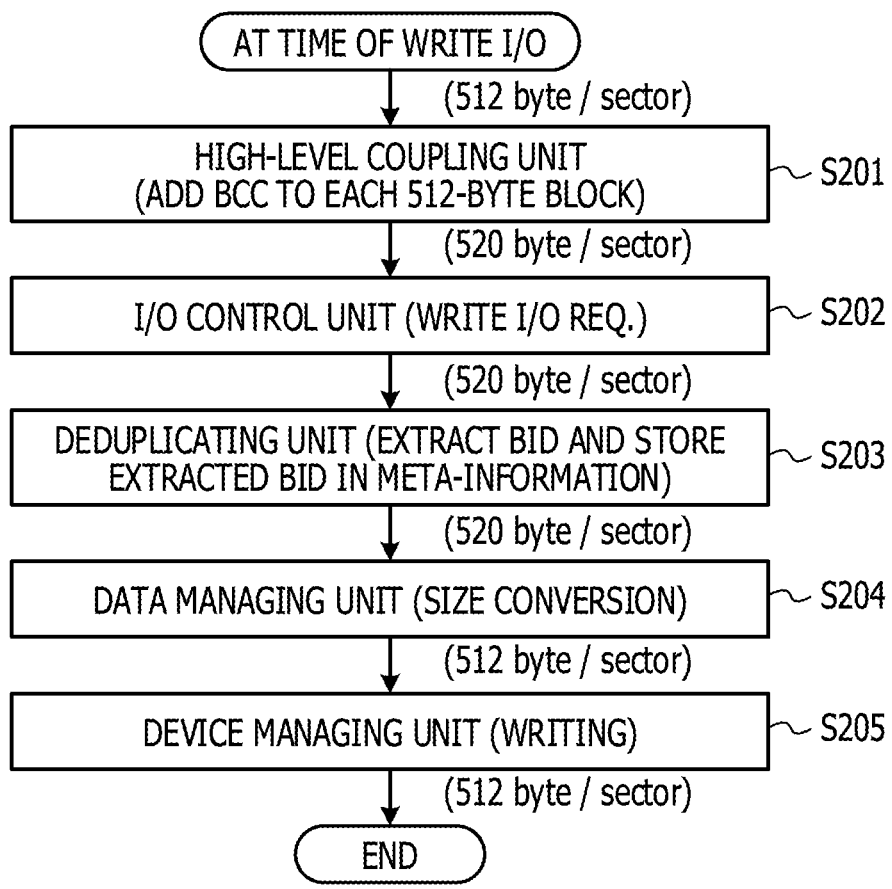
FIG. 15 is a flowchart of assistance in explaining a flow of processing at a time of WRITE I/O.

Processing at a time of WRITE I/O will be further described with reference to FIG. 15. FIG. 15 is a flowchart of assistance in explaining a flow of processing at a time of WRITE I/O. Incidentally, processing by the node 111 will be described as an example in the following.

(S201) The high-level coupling unit 201 receives a WRITE I/O request from the server 51, and generates a plurality of 512-byte blocks by dividing, in units of 512 bytes, each of a plurality of 8-KB blocks included in data (WRITE I/O data) as a target of WRITE I/O processing. In addition, the high-level coupling unit 201 generates 520-byte blocks by adding a BCC to each of the plurality of 512-byte blocks (see FIG. 14).

(S202) The I/O control unit 202 requests the deduplicating unit 203 to write the 520-byte blocks generated by the high-level coupling unit 201 (WRITE I/O Req.).

(S203) The deduplicating unit 203 extracts a BID from a 520-byte block as a writing target, and stores the extracted BID in the BID area 210c (see FIG. 8) of the meta-information 210 indicating the storage position of an 8-KB block corresponding to the 520-byte block. At this time, the deduplicating unit 203 stores a BID corresponding to a 512-byte block present at the head of the 8-KB block in the BID area 210c. When the 8-KB block is a target of deduplication, the deduplicating unit 203 performs deduplication using the meta-information 210 (see FIG. 13).

(S204) The data managing unit 204 converts the plurality of 520-byte blocks generated from the 8-KB block as a writing target into a plurality of 512-byte blocks (size conversion). For example, the data managing unit 204 generates a plurality of 512-byte blocks by cutting out data blocks in units of 512 bytes from a bit string formed by combining the plurality of 520-byte blocks.

(S205) The device managing unit 205 writes the plurality of 512-byte blocks generated by the data managing unit 204 to the storage pool 206. Incidentally, in a case where the 8-KB block as a writing target is cached, the plurality of 512-byte blocks are temporarily written to the memory 111*a*. When the processing of S205 is completed, the series of processing illustrated in FIG. 15 is ended.

(Processing at Time of READ I/O)

Figure 16:
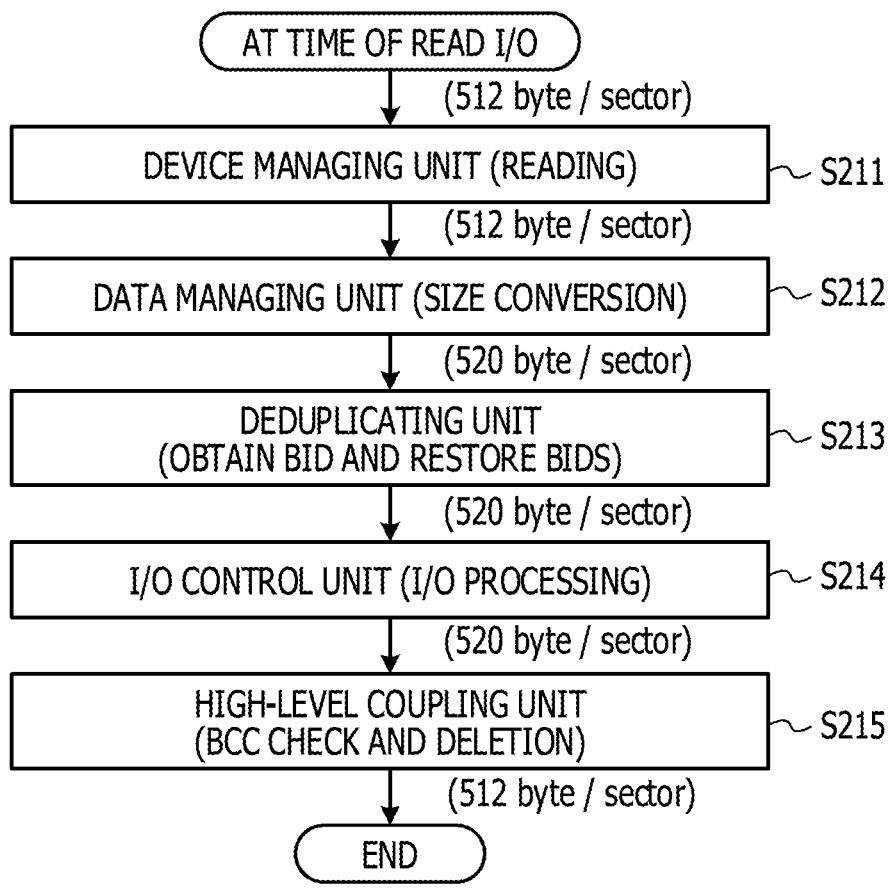
FIG. 16 is a flowchart of assistance in explaining a flow of processing at a time of READ I/O.

Processing at a time of READ I/O will be further described with reference to FIG. 16. FIG. 16 is a flowchart of assistance in explaining a flow of processing at a time of READ I/O. Incidentally, processing by the node 111 will be described as an example in the following.

(S211) The device managing unit 205 reads a plurality of 512-byte blocks corresponding to an 8-KB block as a reading target from the storage pool 206.

(S212) The data managing unit 204 converts each of the plurality of 512-byte blocks read by the device managing unit 205 into 520-byte blocks (size conversion). For example, the data managing unit 204 generates a plurality of 520-byte blocks by cutting out data blocks in units of 520 bytes from a bit string formed by combining the plurality of 512-byte blocks with each other.

(S213) The deduplicating unit 203 obtains a BID from the BID area 210*c* of the meta-information 210 corresponding to the 8-KB block as a reading target. The BID obtained from the BID area 210*c* of the meta-information 210 is a BID corresponding to a 512-byte block located at the head of the 8-KB block. The deduplicating unit 203 therefore restores BIDs corresponding to 512-byte blocks located at other than the head of the 8-KB block based on the obtained BID.

For example, the deduplicating unit 203 generates BIDs each obtained by incrementing, by one, a counter value present in the counter area of the BID obtained from the BID area 210*c*, and sets the BIDs corresponding to positions within the 8-KB block in the BCCs of the respective 520-byte blocks. In a case where the head of the 8-KB block is a zeroth block, the BID corresponding to a 512-byte block present at an mth position from the head is a value obtained by adding m to the count value of the BID obtained from the BID area 210*c*.

(S214) The I/O control unit 202 transfers the 520-byte blocks restored by the deduplicating unit 203 to the high-level coupling unit 201.

(S215) The high-level coupling unit 201 checks the 512-byte blocks for an error using the BCCs of the 520-byte blocks received from the I/O control unit 202 (BCC check). Then, the high-level coupling unit 201 restores the 512-byte blocks by deleting the BCCs from the 520-byte blocks, and transmits an 8-KB block formed by combining the restored 512-byte blocks with each other to the server 51. When the processing of S215 is completed, the series of processing illustrated in FIG. 16 is ended.

Incidentally, in the description of FIG. 15 and FIG. 16, for the convenience of the description, description of the processing of data compression and decompression, addition and deletion of the reference information 207, and the like is omitted. A flow of processing including data compression and decompression will be further described in subsequent paragraphs. For addition and deletion of the reference information 207, on the other hand, reference is to be made to the description of FIG. 6 and FIGS. 10 to 12 already illustrated.

(WRITE: Data Division, BCC Addition, BID Storing, and Like)

In the following, processing of data division, BCC addition, BID storing, and the like in processing at a time of WRITE I/O will be further described with reference to FIG. 17 and FIG. 18.

Figure 17:
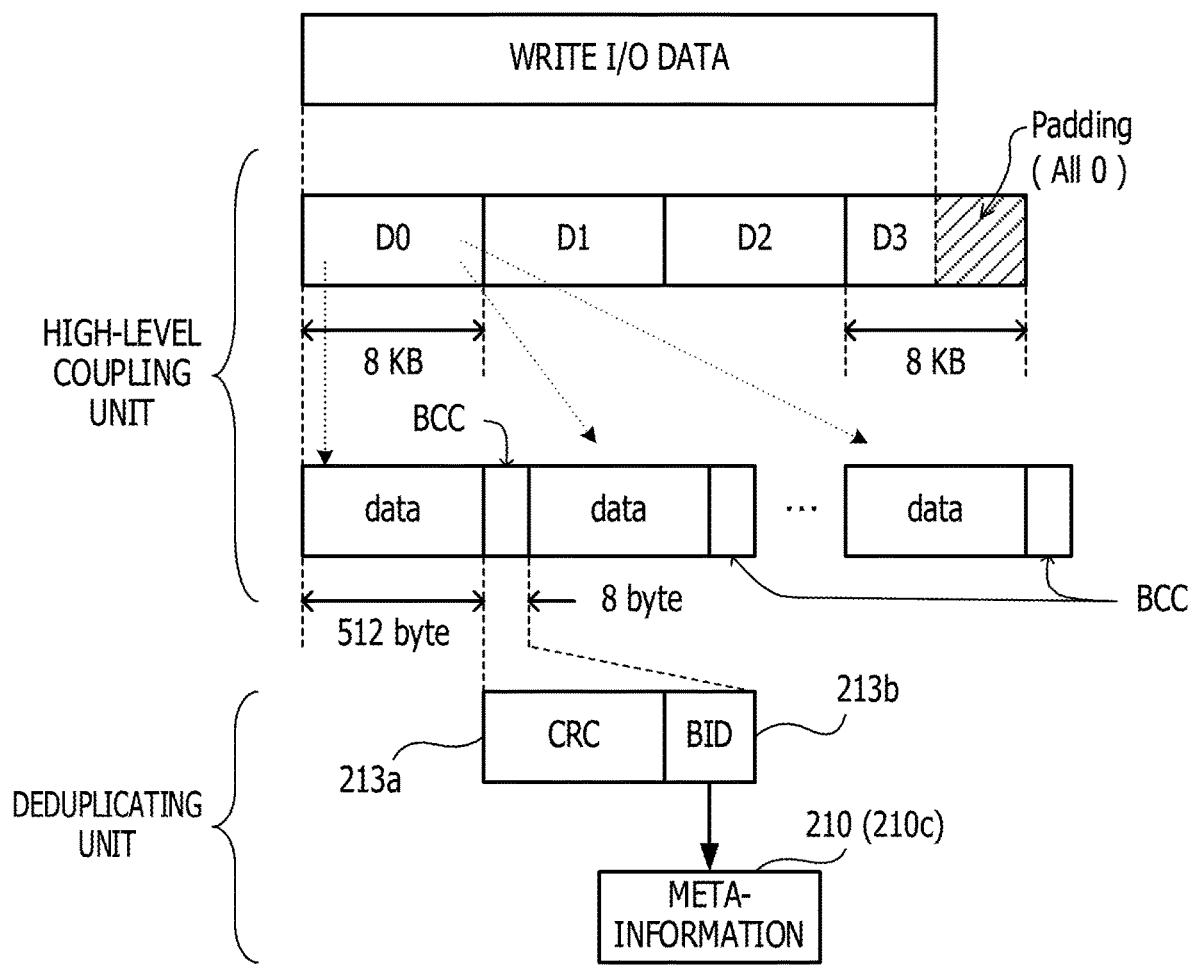
FIG. 17 is a diagram of assistance in explaining data division, BCC addition, block identifier (BID) storing, and the like in processing at a time of WRITE I/O.
Figure 18:
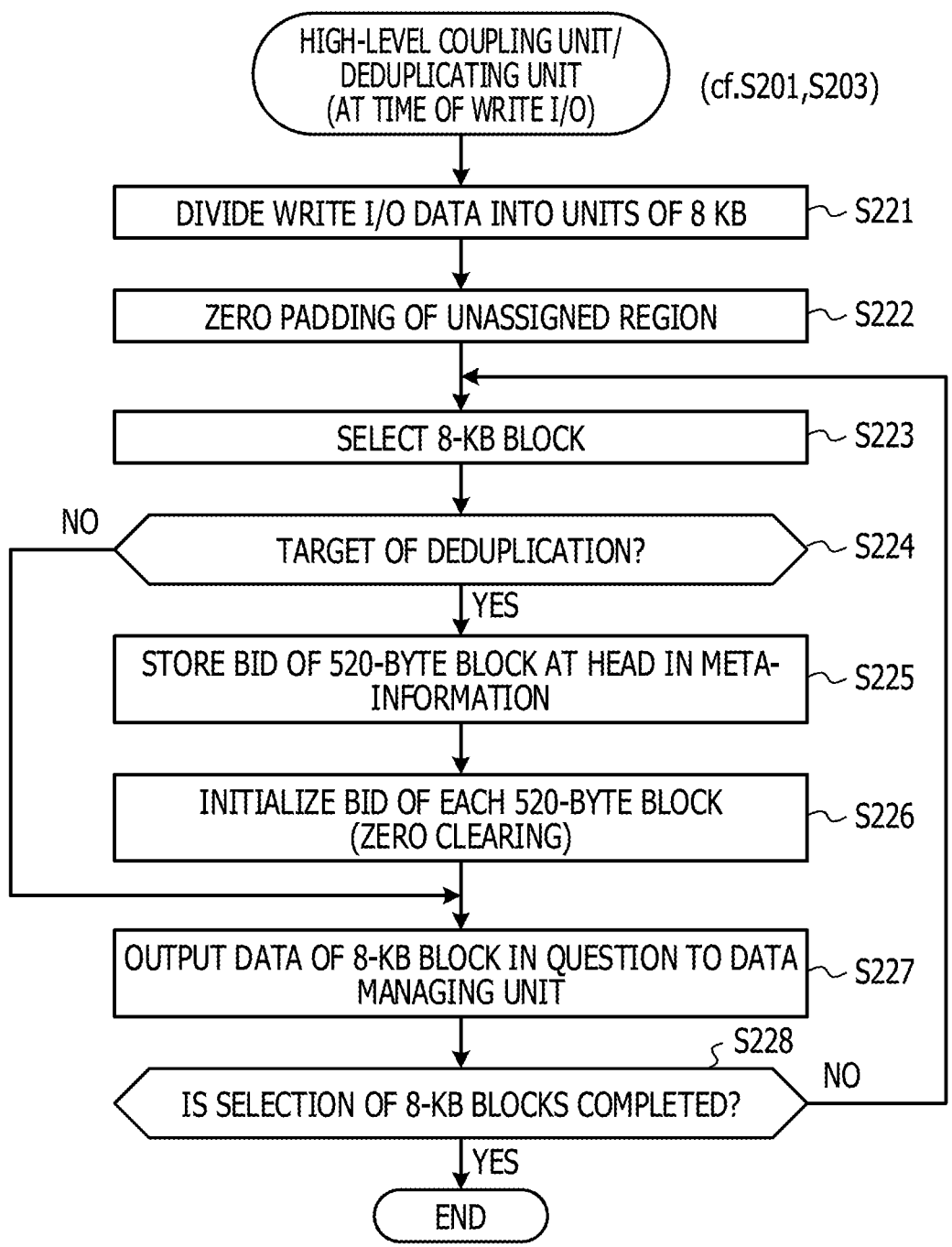
FIG. 18 is a flowchart of assistance in explaining a flow of processing related to data division, BCC addition, BID storing, and the like in processing at a time of WRITE I/O.

FIG. 17 is a diagram of assistance in explaining data division, BCC addition, BID storing, and the like in processing at a time of WRITE I/O. FIG. 18 is a flowchart of assistance in explaining a flow of processing related to data division, BCC addition, BID storing, and the like in processing at a time of WRITE I/O.

As illustrated in FIG. 17, when obtaining WRITE I/O data from the server 51, the high-level coupling unit 201 divides the WRITE I/O data into 8-KB blocks. At this time, depending on the size of the WRITE I/O data, a data block less than the size of 8 KB may occur (part of data D3). In such a case, the high-level coupling unit 201 performs padding processing so that the data block becomes 8 KB. For example, the high-level coupling unit 201 adds a bit value 0 in the rear of the data D3 until the data block becomes the size of 8 KB.

After generating the 8-KB blocks, the high-level coupling unit 201 divides the 8-KB blocks into a plurality of 512-byte blocks. In addition, the high-level coupling unit 201 generates 520-byte blocks by adding a BCC to each of the plurality of 512-byte blocks. The deduplicating unit 203 extracts the BID 213*b* of a 520-byte block corresponding to the head of an 8-KB block, and stores the BID 213*b* in the BID area 210*c* of the meta-information 210. Then, 512-byte blocks generated from the 520-byte blocks by size conversion are written to the storage pool 206.

Processing of data division, BCC addition, BID storing, and the like as described above is performed along a flow of FIG. 18, for example. Incidentally, processing illustrated in FIG. 18 corresponds to the processing of S201 and S203 described above.

(S221 and S222) The high-level coupling unit 201 generates a plurality of 8-KB blocks by dividing WRITE I/O data into 8 KB units. When a part of an 8-KB block has a region without data (unassigned region) (see the part of the data D3 in FIG. 17), the high-level coupling unit 201 performs padding processing that fills the unassigned region with a bit value 0.

(S223) The high-level coupling unit 201 selects an 8-KB block as a processing target. Then, the high-level coupling unit 201 divides the selected 8-KB block into a plurality of 512-byte blocks, and generates 520-byte blocks by adding a BCC to each of the 512-byte blocks.

(S224) The deduplicating unit 203 determines whether or not the 8-KB block selected by the high-level coupling unit 201 is a target of deduplication.

For example, the deduplicating unit 203 calculates the hash value of the selected 8-KB block, and searches for user data 208 that includes the same hash value as the calculated hash value in reference information 207 (SB 207*a*). When there is user data 208 including the same hash value, the deduplicating unit 203 determines that the selected 8-KB block is a target of deduplication.

When the selected 8-KB block is a target of deduplication, the processing proceeds to S225. When the selected 8-KB block is not a target of deduplication, on the other hand, the processing proceeds to S227.

(S225) The deduplicating unit 203 extracts a BID 213*b* from the BCC of a 520-byte block (520-byte block at the head) corresponding to a 512-byte block at the head of the 8-KB block. The deduplicating unit 203 then stores the extracted BID 213b in the BID area 210c of the meta-information 210 corresponding to the selected 8-KB block.

(S226) The deduplicating unit 203 initializes a BID present in the BCC of each 520-byte block. For example, the deduplicating unit 203 rewrites the BID present in the BCC of each 520-byte block with a bit value 0.

(S227 and S228) The deduplicating unit 203 outputs the data of the selected 8-KB block (8-KB block in question) to the data managing unit 204. The high-level coupling unit 201 determines whether or not all of the 8-KB blocks generated from the WRITE I/O data complete being selected. When all of the 8-KB blocks complete being selected, the series of processing illustrated in FIG. 18 is ended. When there is an unselected 8-KB block, on the other hand, the processing proceeds to S223.

(WRITE: Size Conversion and Like)

Processing such as size conversion and the like in processing at a time of WRITE I/O will next be further described with reference to FIG. 19 and FIG. 20.

Figure 19:
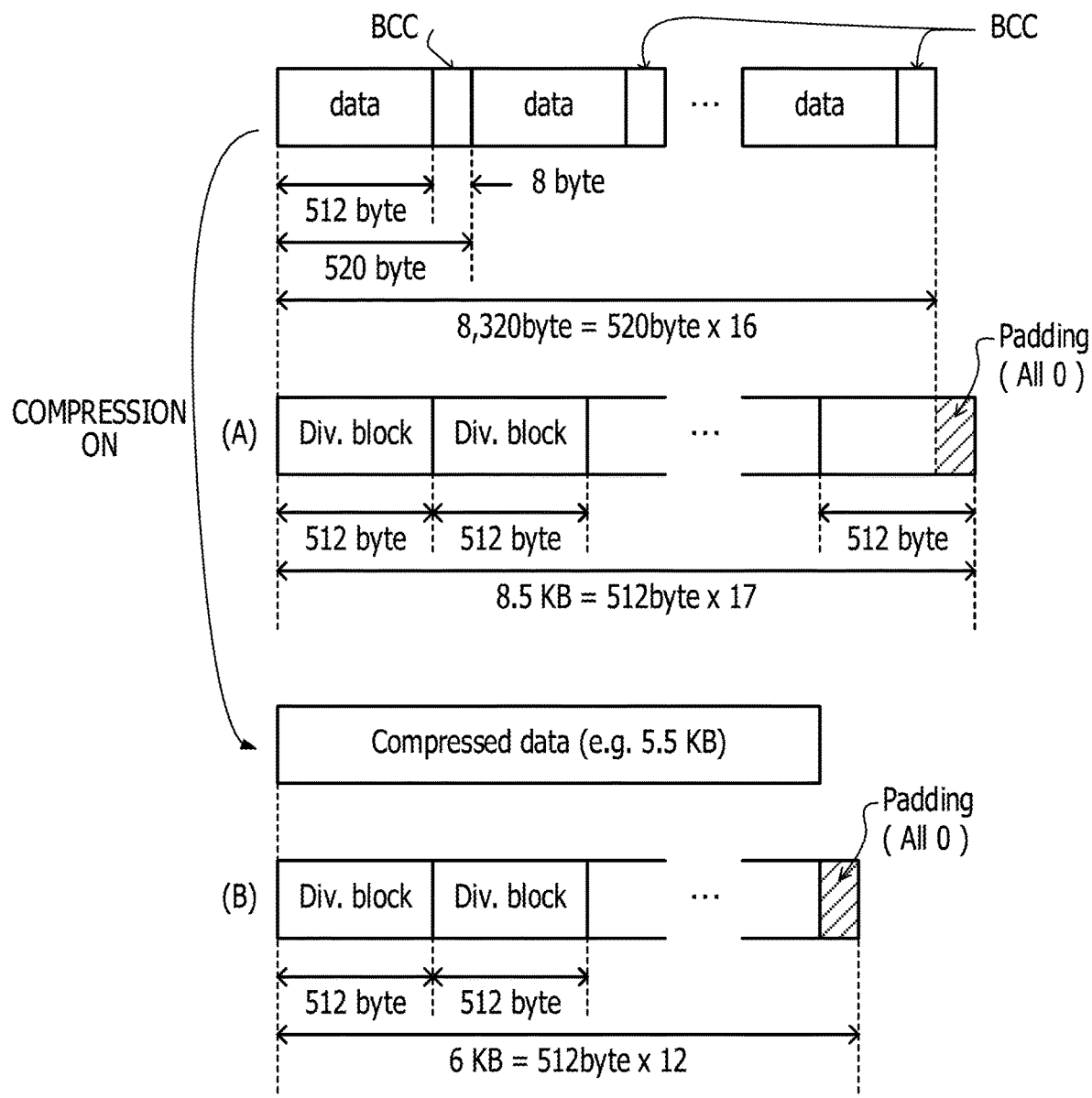
FIG. 19 is a diagram of assistance in explaining size conversion and the like in processing at a time of WRITE I/O.
Figure 20:
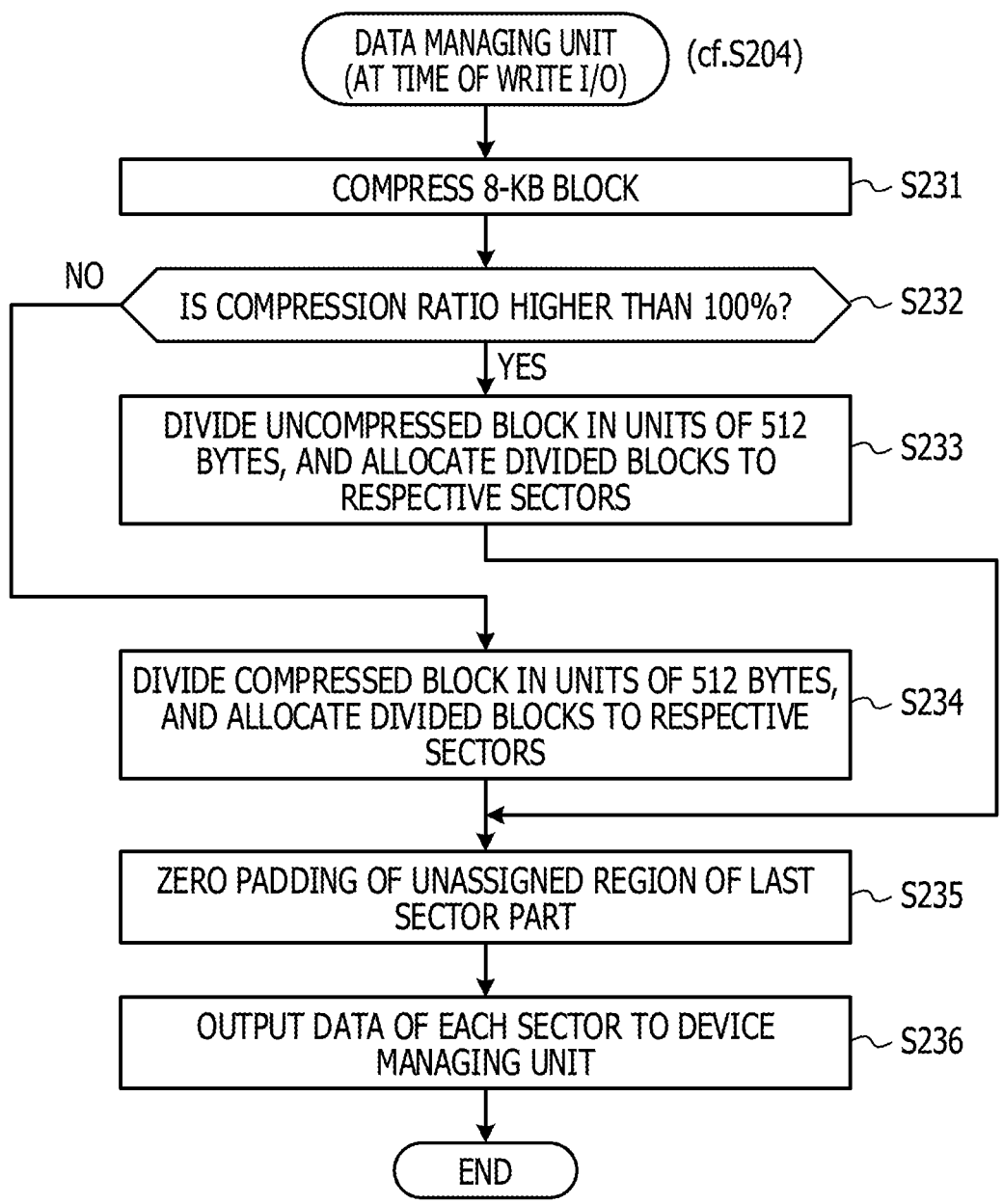
FIG. 20 is a flowchart of assistance in explaining a flow of processing related to size conversion and the like in processing at a time of WRITE I/O.

FIG. 19 is a diagram of assistance in explaining size conversion and the like in processing at a time of WRITE I/O. FIG. 20 is a flowchart of assistance in explaining a flow of processing related to size conversion and the like in processing at a time of WRITE I/O.

Description of compression of an 8-KB block has thus far been omitted for the convenience of description. However, processing may be made to proceed as in the above description also in a case where an 8-KB block is compressed. For example, when a plurality of 520-byte blocks are generated from an 8-KB block by the method described above, data of 8320 bytes (520 bytes×16) is obtained, as illustrated in FIG. 19.

In this case, in order to adjust data size to the sector size of a recording medium, as in (A), the data managing unit 204 divides the plurality of 520-byte blocks in units of 512 bytes, and fills an unassigned region with a bit value 0 by padding processing. Seventeen 512-byte blocks are obtained by this processing. In a case where the 8-KB block is compressed, on the other hand, as indicated by (B), the data managing unit 204 generates a plurality of 512-byte blocks by dividing data after compression in units of 512 bytes.

Processing of size conversion and the like as described above is performed along a flow of FIG. 20, for example. Incidentally, processing illustrated in FIG. 20 corresponds to the processing of S204 described above.

(S231) The data managing unit 204 compresses an 8-KB block output from the deduplicating unit 203. At this time, the data managing unit 204 detects the compression ratio of the 8-KB block. The compression ratio is, for example, a ratio between a data size before the compression and a data size after the compression. When the compression reduces the data size to ½, the compression ratio is 50%.

(S232) The data managing unit 204 determines whether or not the compression ratio is higher than 100%. For example, the data managing unit 204 determines whether or not the data size after the compression is smaller than the data size before the compression. When the compression ratio is higher than 100%, the processing proceeds to S233. When the compression ratio is lower than 100%, on the other hand, the processing proceeds to S234.

(S233) The data managing unit 204 divides the 8-KB block before the compression (uncompressed block) in units of 512 bytes, and allocates the divided blocks to respective sectors. For example, as indicated by (A) of FIG. 19, the data managing unit 204 generates a plurality of 512-byte blocks by dividing the uncompressed block. After the processing of S233 is completed, the processing proceeds to S235.

(S234) The data managing unit 204 divides the 8-KB block after the compression (compressed block) in units of 512 bytes, and allocates the divided blocks to respective sectors. For example, as indicated by (B) of FIG. 19, the data managing unit 204 generates a plurality of 512-byte blocks by dividing the compressed block.

(S235 and S236) When a 512-byte block at an end (last sector part) of the 512-byte blocks generated by the division has an unassigned region, the data managing unit 204 fills the unassigned region with a bit value 0 by padding processing. The data managing unit 204 then outputs the data of each sector (each 512-byte block) to the device managing unit 205. After the processing of S236 is completed, the series of processing illustrated in FIG. 20 is ended.

(READ: Size Conversion and Like)

Figure 21:
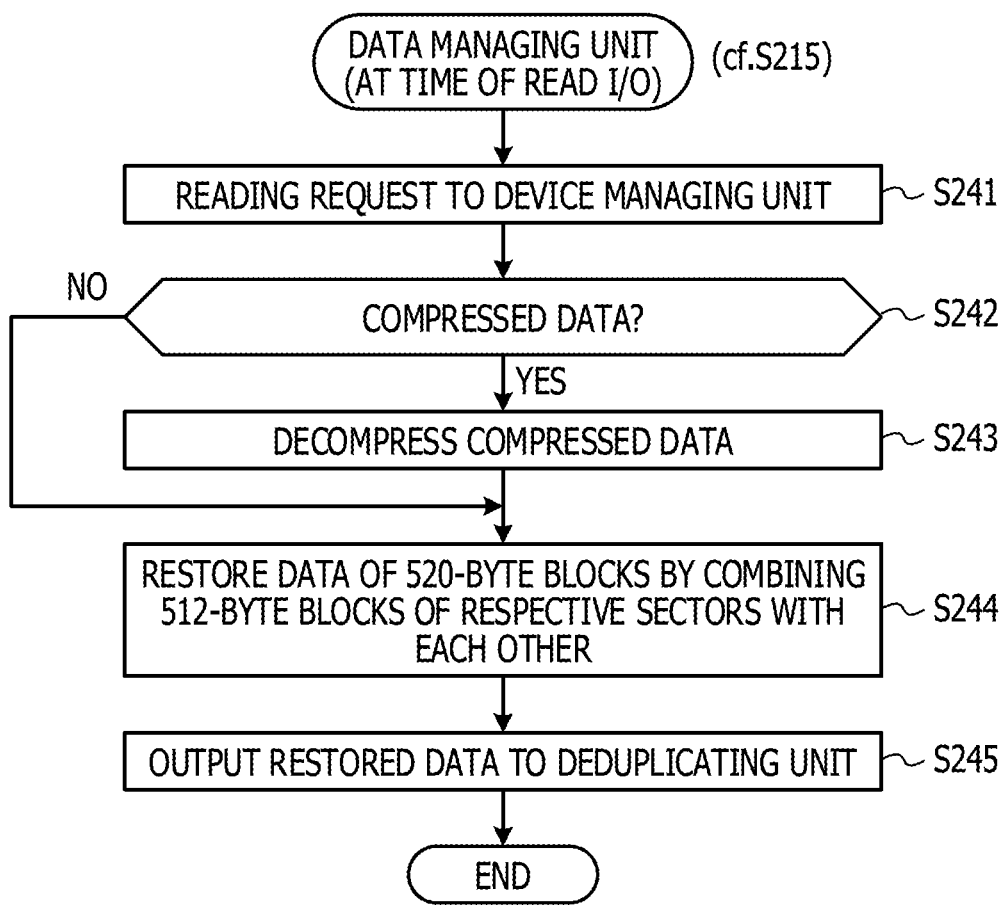
FIG. 21 is a flowchart of assistance in explaining a flow of processing related to size conversion and the like in processing at a time of READ I/O.

Processing related to size conversion and the like in processing at a time of READ I/O will next be further described with reference to FIG. 21. FIG. 21 is a flowchart of assistance in explaining a flow of processing related to size conversion and the like in processing at a time of READ I/O. Incidentally, the processing illustrated in FIG. 21 corresponds to the processing of S215 described above.

(S241) The data managing unit 204 makes a reading request that requests the device managing unit 205 to read data of an 8-KB block from the storage pool 206.

(S242) The data managing unit 204 determines whether or not the data of the 8-KB block read by the device managing unit 205 is compressed data. When the data of the 8-KB block read by the device managing unit 205 is compressed data, the processing proceeds to S243. When the data of the 8-KB block read by the device managing unit 205 is not compressed data (uncompressed data), on the other hand, the processing proceeds to S244.

(S243) The data managing unit 204 restores compressed data by combining a plurality of 512-byte blocks with each other, and decompresses the restored compressed data.

(S244 and S245) The data managing unit 204 restores the data of 520-byte blocks by combining the 512-byte blocks of respective sectors with each other. For example, the data managing unit 204 restores the data of 520-byte blocks by performing reverse conversion of data resulting from size conversion into 512-byte blocks according to the sector size at a time of WRITE I/O. The data managing unit 204 then outputs the restored data to the deduplicating unit 203.

(READ: BID Restoration and Like)

Processing related to BID restoration and the like in processing at a time of READ I/O will next be further described with reference to FIG. 22. FIG. 22 is a flowchart of assistance in explaining a flow of processing related to BID restoration and the like in processing at a time of READ I/O. Incidentally, the processing of FIG. 22 corresponds to the processing of S213 and S215 described above.

(S251 and S252) The deduplicating unit 203 obtains the data of an 8-KB block (set of 520-byte blocks) output from the data managing unit 204. In addition, the deduplicating unit 203 reads meta-information 210 corresponding to the obtained 8-KB block from the storage pool 206 or the meta-information cache 212.

(S253) The deduplicating unit 203 determines whether or not the obtained 8-KB block is a target of deduplication. For example, when there is other meta-information indicating the data position of the same logical area as the logical address information 210a of the meta-information 210 corresponding to the obtained 8-KB block, the deduplicating unit 203 determines that the obtained 8-KB block is a target of deduplication.

When the obtained 8-KB block is a target of deduplication, the processing proceeds to S254. When the obtained 8-KB block is not a target of deduplication, on the other hand, the processing proceeds to S256.

(S254) The deduplicating unit 203 obtains a BID 213b from the BID area 210c of the meta-information 210. The BID 213b is the BID 213b of a BCC added to a 512-byte block located at the head of the 8-KB block.

(S255) The deduplicating unit 203 sets the obtained BID 213b in the BCC of a 520-byte block corresponding to the head of the 8-KB block. In addition, the deduplicating unit 203 restores BIDs to be set in the BCCs of respective 520-byte blocks present at other than the head of the 8-KB block by incrementing a counter value included in the obtained BID 213b.

(S256) The deduplicating unit 203 restores all of the 520-byte blocks corresponding to the 8-KB block by setting the restored BIDs in the BCCs of the respective 520-byte blocks. In addition, the deduplicating unit 203 determines whether or not all of 8-KB blocks as reading targets complete being obtained. When all of the 8-KB blocks complete being obtained, the processing proceeds to S257. When there is an 8-KB block not yet obtained, on the other hand, the processing proceeds to S251.

(S257) The deduplicating unit 203 outputs READ I/O data with BCCs (set of 520-byte blocks corresponding to each 8-KB block) to the I/O control unit 202. Each 520-byte block is input to the high-level coupling unit 201 via the I/O control unit 202, and is transmitted to the server 51 after a BCC check and BCC deletion by the high-level coupling unit 201. After the processing of S257 is completed, the series of processing illustrated in FIG. 22 is ended.

As described above, the BID 213b included in a BCC is retained in the meta-information 210, and deduplication is performed for 512-byte blocks. This contributes to improving efficiency of the deduplication. In addition, because the BID 213b is stored in the meta-information 210, an area for storing the BID 213b does not need to be secured in the memory 111a or the storage pool 206. This contributes to saving a storage capacity. In addition, the BID 213b of the 520-byte block at the head is stored in the meta-information 210, and the BIDs of the other 520-byte blocks are restored by calculation. This contributes to further saving the storage capacity.

The second embodiment has been described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage control apparatus comprising:
   a memory configured to store a plurality of meta-information associating a position of a logical area with a position of a physical area; and
   a processor coupled to the memory and configured to:
   when a first data block including data, a check code corresponding to the data, and first positional information within the logical area is stored in the physical area, and a second data block including the data, the check code, and second positional information within the logical area is written in the logical area, obtain a first position at which the first data block is present in the physical area included in meta-information of the first data block among the plurality of the meta-information, the second positional information includes a plurality of pieces of additional information individually corresponding to a plurality of pieces of divided data that is included the data;
   store, in the meta-information of the second data block among the plurality of the meta-data, the first position as a position of the physical area; and
   store, in the meta-information of the second data block among the plurality of the meta-data, the second positional information within logical area obtained from the second data block in association with the first position;
   store, in the memory, first additional information corresponding to a divided data present at a head of the data among the plurality of pieces of additional information when storing the second information in the memory; and
   generate a second additional information based on the first additional information present in the memory among the plurality of pieces of additional information when restoring the second data block, the second additional information is remaining pieces of additional information among the plurality of pieces of additional information.

2. The storage control apparatus according to claim 1, wherein the processor
   refers to the meta-information of the second data block in the meta-information and reads the first data block from the physical area when reading the second data block from the logical area, and
   restores the second data block based on the second positional information related to the position within the logical area and the check code included in the first data block.

3. The storage control apparatus according to claim 2, wherein
   each of the plurality of pieces of additional information includes a counter value indicating an ordinal position of corresponding divided data among the plurality of pieces of divided data from the head of the data, and.

4. The storage control apparatus according to claim 3, wherein the processor writes the second positional information to the meta-information of the second data block in the meta-information.

5. The storage control apparatus according to claim 4, wherein the processor
   divides the first data block into a plurality of data elements such that each of the plurality of data elements has a same size as a unit section set in the physical area when writing the first data block to the physical area, and
   writes the plurality of data elements to the physical area.

6. A storage control method for a storage apparatus including a memory configured to store a plurality of meta-information associating a position of a logical area with a position of a physical area and a processor coupled to the memory, comprising:
   obtaining a first position at which a first data block is present in the physical area included in meta-information of the first data block among the plurality of the meta-information, the first data block being stored in the physical area, and including data, a check code corresponding to the data, and first positional information within the logical area;

storing, in the meta-information of a second data block among the plurality of the meta-data, the first position as a position of the physical; and storing, in the meta-information of the second data block among the plurality of the meta-data, the second positional information within logical area obtained from the second data block in association with the first position, the second data block including the data, the check code, and second positional information within the logical area is written in the logical area, the second positional information includes a plurality of pieces of additional information individually corresponding to a plurality of pieces of divided data that is included the data;

storing, in the memory, first additional information corresponding to a divided data present at a head of the data among the plurality of pieces of additional information when storing the second information in the memory; and generating a second additional information based on the first additional information present in the memory among the plurality of pieces of additional information when restoring the second data block, the second additional information is remaining pieces of additional information among the plurality of pieces of additional information.

\* \* \* \* \*